United States Patent
Nguyen

(10) Patent No.: US 11,120,705 B2
(45) Date of Patent: Sep. 14, 2021

(54) APPARATUS, METHOD, AND SYSTEM OF COGNITIVE ASSISTANCE FOR TRANSFORMING MULTIMEDIA CONTENT INTO A COGNITIVE FORMATION

(71) Applicant: FUVI COGNITIVE NETWORK CORP., Framingham, MA (US)

(72) Inventor: Phu-Vinh Nguyen, Sherborn, MA (US)

(73) Assignee: FUVI COGNITIVE NETWORK CORP., Framingham, MA (US)

( * ) Notice: Subject to any disclaimer, the term of this patent is extended or adjusted under 35 U.S.C. 154(b) by 0 days.

(21) Appl. No.: 17/002,346

(22) Filed: Aug. 25, 2020

(65) Prior Publication Data

US 2021/0256868 A1    Aug. 19, 2021

Related U.S. Application Data

(60) Provisional application No. 62/976,078, filed on Feb. 13, 2020.

(51) Int. Cl.
G09B 19/00    (2006.01)
G09B 5/06    (2006.01)
(Continued)

(52) U.S. Cl.
CPC ......... *G09B 19/00* (2013.01); *G06K 9/00718* (2013.01); *G09B 5/065* (2013.01); *G11B 27/34* (2013.01)

(58) Field of Classification Search
CPC .... G09B 19/00; G09B 5/065; G06K 9/00718; G11B 27/34
(Continued)

(56) References Cited

U.S. PATENT DOCUMENTS 8,137,112 B2    3/2012    Woolf et al.
8,201,080 B2    6/2012    Basson et al.
(Continued)

FOREIGN PATENT DOCUMENTS

CN    110765314 A    2/2020

OTHER PUBLICATIONS

The RSA, "Steven Pinker—The Stuff of Thought: Language as a window into human nature", Youtube, Feb. 2010; https://youtu.be/5S1d3cNge24.
(Continued)

*Primary Examiner* — Thai Q Tran
*Assistant Examiner* — Stephen R Smith
(74) *Attorney, Agent, or Firm* — Edell, Shapiro & Finnan, LLC

(57) ABSTRACT

A cognitive assistant system which includes an episodic-based time-framed cognitive scaffold and visual comprehension platforms for building coherence and comprehension, facilitating learning, deepening understanding and improving the efficiency of problem solving and decision-making of a particular user. A method, a system, an apparatus, and a computer readable medium are provided for cognitive assistance. The method includes obtaining and dividing multimedia data into cognitive blocks based on the user input. The method further includes generating a comprehension block that corresponds to a respective cognitive block where the comprehension block includes enrichment data related to the respective cognitive block and is linked to the respective cognitive block to thereby form at least one cognitive insight with respect to the multimedia data. The comprehension block is provided based on a consecutive output of the cognitive blocks being paused at the respective cognitive block.

22 Claims, 21 Drawing Sheets

(51) Int. Cl.
*G06K 9/00* (2006.01)
*G11B 27/34* (2006.01)

(58) Field of Classification Search
USPC ...... 434/236, 257, 323; 345/633; 455/452.1; 707/740; 715/706, 230; 752/32
See application file for complete search history.

(56) References Cited

U.S. PATENT DOCUMENTS

| | | |
|---|---|---|
| 9,451,899 B2 | 9/2016 | Ritchey et al. |
| 10,127,825 B1* | 11/2018 | Nguyen ................. G09B 5/065 |
| 10,222,946 B2 | 3/2019 | Kitch et al. |
| 10,322,349 B2 | 6/2019 | Cohen et al. |
| 10,367,931 B1 | 7/2019 | Nguyen |
| 10,547,582 B1* | 1/2020 | Kwatra ................. G06F 16/958 |
| 10,664,489 B1 | 5/2020 | Nguyen |
| 2003/0211447 A1* | 11/2003 | Diesel ...................... G09B 5/00 434/118 |
| 2011/0173235 A1* | 7/2011 | Aman ................. G06K 9/00342 707/792 |
| 2015/0046822 A1* | 2/2015 | Kitch ................... G06F 3/04842 715/721 |
| 2016/0117339 A1* | 4/2016 | Raskin .................. G06F 16/958 434/309 |
| 2016/0381437 A1 | 12/2016 | Kitch et al. |
| 2018/0011828 A1* | 1/2018 | Yadav ................... G06F 40/169 |
| 2019/0213900 A1* | 7/2019 | Erickson ............... G06F 3/0482 |
| 2019/0221131 A1* | 7/2019 | Levinson ................. G09B 7/08 |
| 2019/0236371 A1 | 8/2019 | Boonmee et al. |
| 2019/0244127 A1* | 8/2019 | Amado .................... G09B 7/02 |
| 2019/0384466 A1* | 12/2019 | Lu ....................... G06K 9/00718 |
| 2021/0004131 A1* | 1/2021 | Varshney ............... G11B 27/32 |

OTHER PUBLICATIONS

International Search Report and Written Opinion in counterpart International Application No. PCT/US21/14882, dated Apr. 6, 2021, 13 pages.

* cited by examiner

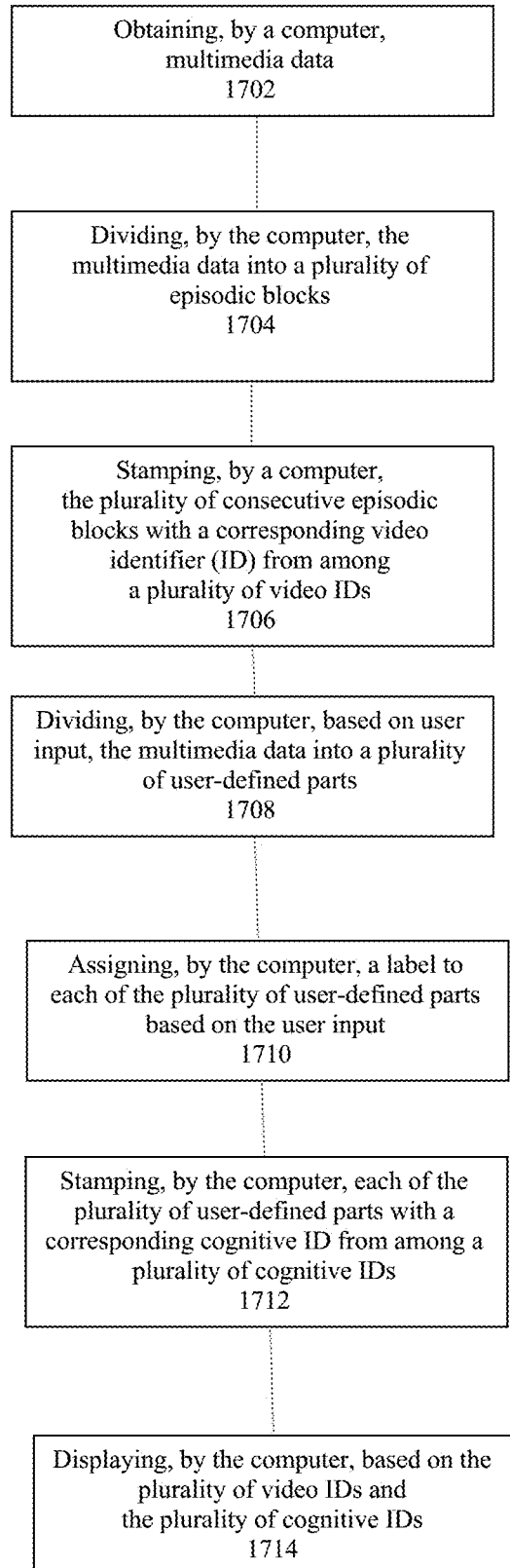

APPARATUS, METHOD, AND SYSTEM OF COGNITIVE ASSISTANCE FOR TRANSFORMING MULTIMEDIA CONTENT INTO A COGNITIVE FORMATION

CROSS-REFERENCE TO RELATED APPLICATION

This application claims priority from U.S. Provisional Application No. 62/976,078, filed on Feb. 13, 2020, titled "System and Method of Episodic-Based Cognitive Scaffold and Visual-Comprehension Platform for Building Coherence and Deepening Understanding for Improving the Efficiency of Decision-Making and Problem Solving of a User", the content of which is incorporated herein by reference in its entirety.

BACKGROUND

1. Field

Apparatuses, methods, systems, and computer readable mediums consistent with exemplary embodiments broadly relate to cognitive technology.

2. Description of Related Art

World of information grows exponentially. People are challenged to learn and use information from an infinite number of sources to make decisions and solve problems. To evaluate the relevance of information, people need to obtain its contextual background. To use information effectively, people need guidance to gather various information and a platform to perform cognitive tasks. Cognitive tasks may include linking and enriching information, solving a problem, and making a decision.

In related art, people go to school to learn information and obtain skills for problem-solving and decision-making. Well-known schools and professors often provide contextual background such as proven experiments or practical case studies as cognitive-reference guides for understanding of the content. However, it is not easy for all students to retain the links between the learned content and its contextual background due to the limitations of human memory.

Internet is a vast source of information. However, it is even more difficult for people to use information from the Internet effectively due to lacking both contextual background and cognitive-reference guides.

Thus, there is a need for a system that helps people improve their learning and use of information. The system needs to transfer information into cognitive-formatted information that includes comprehension of users. The system needs to provide contextual-reference frames for building coherence. The system also needs to provide cognitive-reference guides and platform for facilitating comprehension-building, decision-making, and problem-solving.

The above information is presented as background to a state of the computerized arts and only to assist with understanding of the present disclosure. No determination has been made, and no assertions are made that any of the above descriptions are applicable as prior art with regard to the present disclosure. The information presented only describes related art techniques, which could be techniques based on internal knowledge of the Applicant.

SUMMARY OF EXEMPLARY EMBODIMENTS

In one or more exemplary embodiments, a computerized system is provided. The system generates a user scaffold including consecutive modular time-framed scaffolding segments, in which the lengths of the scaffolding segments are equal and predetermined. In one or more exemplary embodiments, each modular time-framed scaffolding segment includes a reference time point, a comprehension board, and one or more comprehension guides.

In one or more exemplary embodiments, a computerized system receives and divides content into consecutive modular episodes, in which the lengths of modular episodes are equal and equal with the length of the episodic time-framed scaffolding segment.

In one or more exemplary embodiments, a computerized system identifies reference time point for each episode, creates episodic blocks, a semantic block for each episodic block, and stamp reference time point on each episodic block and semantic block.

In one or more exemplary embodiments, the system generates a comprehension block by gathering, processing, and linking semantic blocks on the respective generated comprehension board, and stamps reference time point on each generated comprehension block.

In one or more exemplary embodiments, the system stores the generated comprehension block in the generated comprehension board.

Illustrative, non-limiting embodiments may overcome the above disadvantages and other disadvantages not described above, and also may have been developed to provide solutions to other disadvantages and problems that were not described above. However, a method, an apparatus, a system, and a computer readable medium that operates according to the teachings of the present disclosure are not necessarily required to overcome any of the particular problems or disadvantages described above. It is understood that one or more exemplary embodiment is not required to overcome the disadvantages described above, and may not overcome any of the problems described above. The appended claims should be consulted to ascertain the true scope of the present disclosure.

According to an aspect of various exemplary, non-limiting embodiments, a computerized method is provided. The method provides cognitive assistance. The method includes obtaining, by a computer, multimedia data and first user input, dividing, by the computer, the multimedia data into a plurality of cognitive blocks based on the first user input, and obtaining, by the computer, second user input. The method further includes generating, by the computer, a comprehension block that corresponds to a respective cognitive block from among the plurality of cognitive blocks, wherein the comprehension block includes enrichment data related to the respective cognitive block, linking the comprehension block with the respective cognitive block to thereby form at least one cognitive insight with respect to the multimedia data, and providing the comprehension block based on a consecutive output of the plurality of cognitive blocks being paused at the respective cognitive block.

According to various exemplary, non-limiting embodiments, dividing the multimedia data into the plurality of cognitive blocks may include dividing the multimedia data into a plurality of cognitive resolution units (CRUs), the CRUs are equal in length and correspond to a specious present, stamping a unique video identifier (ID) on each of the plurality of CRUs, grouping at least two consecutive CRUs into the respective cognitive block based on the first user input, and stamping a cognitive ID on the respective cognitive block.

According to various exemplary, non-limiting embodiments, the method may further include semantically analyzing, by the computer, the plurality of CRUs to extract a semantic meaning of each of the plurality of CRUs, converting, by the computer, the semantic meaning into a text, a sketch, a symbol, or an image to represent a cue for a respective CRU, and generating, by the computer, a plurality of semantic blocks that respectively correspond to the plurality of CRUs and further comprise the cue.

According to various exemplary, non-limiting embodiments, the method may further include obtaining, by the computer, third user input comprising a selection of a portion of the multimedia data and a corresponding cue, generating a comprehension guide including the cue, and displaying, by the computer, the comprehension guide on a comprehension platform together with the plurality of cognitive blocks.

According to various exemplary, non-limiting embodiments, the at least one cognitive block and the comprehension block form a cognitive insight which is a contextual comprehension block for facilitating solving a problem or making a decision.

According to various exemplary, non-limiting embodiments, the method may further include synchronously displaying, by the computer, the plurality of cognitive blocks on a comprehension board, obtaining a third user input to pause at the respective cognitive block, performing, by the computer, a lookup operation for the comprehension block linked to the respective cognitive block, pausing at the respective cognitive block based on the third user input, and in response to pausing at the respective cognitive block, displaying the comprehension block on the comprehension board based on the lookup operation so as to facilitate solving a problem or making a decision based on the plurality of cognitive blocks surrounding the respective cognitive block and the comprehension block.

According to various exemplary, non-limiting embodiments, the comprehension board is a user interface configured to receive additional user input for solving the problem or making the decision in the comprehension block.

According to various exemplary, non-limiting embodiments, the method may include obtaining third user input comprising at least one keyword, performing, by the computer, a lookup for the keyword in the plurality of cognitive blocks, and displaying, by the computer, on a comprehension board the respective cognitive block and/or the comprehension block that is linked to the keyword.

According to various exemplary, non-limiting embodiments, dividing the multimedia data into the plurality of cognitive blocks may include obtaining, by the computer, a first location in the multimedia data based on a first user selection, obtaining, by the computer, a second location in the multimedia data based on a second user selection, obtaining, by the computer, a label being input for a portion of the multimedia data between the first location and the second location, generating, by the computer, the respective cognitive block comprising the portion of the multimedia data, the respective cognitive block includes the label, and repeating obtaining the first location, the second location, and the label and generating the cognitive block to generate the plurality of cognitive blocks.

According to various exemplary, non-limiting embodiments, the method may further include generating and outputting a comprehension guide including a plurality of labels for the plurality of cognitive blocks. The plurality of cognitive blocks may have different durations and/or form a hierarchical structure including a plurality of user-defined parts and a plurality of user-defined sub-parts. The multimedia data may be divided into the plurality of cognitive blocks is occurring during playback of the multimedia data.

According to various exemplary, non-limiting embodiments, the method may further include generating, by the computer, a first set of metadata for the multimedia data and a second set of metadata for the multimedia data and generating and outputting, by the computer, a first search field for searching the first set of metadata and a second search field for searching the second set of metadata. The first set of metadata and the second set of metadata may be keywords input by different users and/or relate to a different hierarchical level of the multimedia data.

According to another aspect of various exemplary embodiments, a method is provided for cognitive assistance. The method includes obtaining, by a computer, multimedia data, dividing, by the computer, the multimedia data into a plurality of consecutive episodic blocks, stamping, by the computer, the plurality of consecutive episodic blocks with a corresponding video identifier (ID) from among a plurality of video IDs, dividing, by the computer, based on user input, the multimedia data into a plurality of user-defined parts, assigning, by the computer, a label to each of the plurality of user-defined parts based on the user input, stamping, by the computer, each of the plurality of user-defined parts with a corresponding cognitive ID from among a plurality of cognitive IDs, and displaying, by the computer, based on the plurality of video IDs and the plurality of cognitive IDs, a comprehension guide comprising the label for each of the plurality of the user-defined parts while playing the plurality of episodic blocks.

According to various exemplary, non-limiting embodiments, the method may further include processing, by the computer, a user-defined part from among the plurality of user-defined parts by linking the user-defined part to an enrichment content such that when playing the plurality of episodic blocks is paused, the user-defined part is displayed together with the enrichment content on a comprehension board.

According to various exemplary, non-limiting embodiments, the comprehension board may be configured to obtain additional user input for working on a problem or making a decision. The method may further include generating, by the computer, new enrichment content that includes the additional user input and the enrichment content and replacing, by the computer, the enrichment content with the new enrichment content.

According to various exemplary, non-limiting embodiments, displaying the comprehension guide while playing the plurality of episodic blocks may include displaying an indication or displaying in a distinguishable manner a user-defined part from among the plurality of user-defined parts that corresponds to an episodic block currently being played from among the plurality of episodic blocks.

According to various exemplary, non-limiting embodiments, the plurality of user-defined parts include a hierarchical structure including a first layer of user-defined parts, each including at least one user-defined subpart.

According to various exemplary, non-limiting embodiments, the first layer of user-defined parts and the at least one user-defined subpart are individually searchable.

According to various exemplary, non-limiting embodiments, the method may further include obtaining, by the computer, additional user input including at least one keyword for one of the plurality of episodic blocks and generating, by the computer, an additional comprehension guide comprising the at least one keyword. The comprehension guide and the additional comprehension guide are individually searchable.

According to another aspect of various exemplary embodiments, an apparatus is provided for cognitive assistance. The apparatus includes a memory configured to store computer executable instructions and a processor configured to execute the stored computer executable instructions, which when executed by the processor cause the processor to obtain, via a user interface, a first user input, divide multimedia data into a plurality of cognitive blocks based on the first user input, obtaining, via the user interface, a second user input, generate a comprehension block that corresponds to a respective cognitive block from among the plurality of cognitive blocks. The comprehension block includes enrichment data related to the respective cognitive block. The stored computer executable instructions further cause the processor to link the comprehension block with the respective cognitive block to thereby form at least one cognitive insight with respect to the multimedia data and provide the comprehension block based on a consecutive output of the plurality of cognitive blocks being paused at the respective cognitive block.

According to various exemplary, non-limiting embodiments, the stored computer executable instructions may further cause the processor to divide the multimedia data into a plurality of cognitive resolution units (CRUs), the CRUs are equal in length and correspond to a specious present, stamp a unique video identifier (ID) on each of the plurality of CRUs, group at least two consecutive CRUs into the respective cognitive block based on the first user input, and stamp a cognitive ID on the respective cognitive block.

According to various exemplary, non-limiting embodiments, the stored computer executable instructions may further cause the processor to semantically analyze the plurality of CRUs to extract a semantic meaning of each of the plurality of CRUs, convert the semantic meaning into a text, a sketch, a symbol, or an image to represent a cue for a respective CRU, and generate a plurality of semantic blocks that respectively correspond to the plurality of CRUs and further comprise the cue.

According to various exemplary, non-limiting embodiments, the stored computer executable instructions may further cause the processor to obtain third user input comprising a selection of a portion of the multimedia data and a corresponding cue, generate a comprehension guide including the cue, and display the comprehension guide on a comprehension platform together with the plurality of cognitive blocks.

According to another aspect of various exemplary embodiments, an apparatus is provided for cognitive assistance. The apparatus includes a memory configured to store computer executable instructions and a processor configured to execute the stored computer executable instructions, which when executed by the processor cause the processor to obtain multimedia data, divide the multimedia data into a plurality of consecutive episodic blocks, stamp the plurality of consecutive episodic blocks with a corresponding video identifier (ID) from among a plurality of video IDs, divide, based on user input, the multimedia data into a plurality of user-defined parts, assign a label to each of the plurality of user-defined parts based on the user input, stamp each of the plurality of user-defined parts with a corresponding cognitive ID from among a plurality of cognitive IDs, and display, based on the plurality of video IDs and the plurality of cognitive IDs, a comprehension guide comprising the label for each of the plurality of the user-defined parts while playing the plurality of episodic blocks.

According to another aspect of various exemplary embodiments, one or more non-transitory computer-readable storage media that includes code for execution and when executed by a processor is operable to perform operations including obtaining multimedia data and first user input, dividing the multimedia data into a plurality of cognitive blocks based on the first user input, obtaining second user input, generating a comprehension block that corresponds to a respective cognitive block from among the plurality of cognitive blocks. The comprehension block includes enrichment data related to the respective cognitive block. The operations further include linking the comprehension block with the respective cognitive block to thereby form at least one cognitive insight with respect to the multimedia data and providing the comprehension block based on a consecutive output of the plurality of cognitive blocks being paused at the respective cognitive block.

According to another aspect of various exemplary embodiments, one or more non-transitory computer-readable storage media that includes code for execution and when executed by a processor is operable to perform operations including obtaining multimedia data, dividing the multimedia data into a plurality of consecutive episodic blocks, stamping the plurality of consecutive episodic blocks with a corresponding video identifier (ID) from among a plurality of video IDs, dividing, based on user input, the multimedia data into a plurality of user-defined parts, assigning a label to each of the plurality of user-defined parts based on the user input, stamping each of the plurality of user-defined parts with a corresponding cognitive ID from among a plurality of cognitive IDs, and displaying, based on the plurality of video IDs and the plurality of cognitive IDs, a comprehension guide including the label for each of the plurality of the user-defined parts while playing the plurality of episodic blocks.

BRIEF DESCRIPTION OF THE DRAWINGS

The accompanying drawings, which are incorporated in and constitute a part of this specification exemplify embodiments and, together with the description, serve to explain and illustrate exemplary embodiments. Specifically:

FIG. 17 is a flowchart illustrating a method of providing cognitive assistance by generating one or more comprehension guides, according to an exemplary embodiment.

DETAILED DESCRIPTION OF EXEMPLARY EMBODIMENTS

Exemplary embodiments will now be described in detail with reference to the accompanying drawings. Exemplary embodiments may be embodied in many different forms and should not be construed as being limited to the illustrative exemplary embodiments set forth herein. Rather, the exemplary embodiments are provided so that this disclosure will be thorough and complete, and will fully convey the illustrative concept to those skilled in the art. Also, well-known functions or constructions may be omitted to provide a clear and concise description of exemplary embodiments. The claims and their equivalents should be consulted to ascertain the true scope of an inventive concept.

The descriptions of the various exemplary embodiments have been presented for purposes of illustration, but are not intended to be exhaustive or limited to the embodiments disclosed.

A cognitive assistance system is generated based on computerized cognitive elements that are called cognitive motifs, hereinafter referred to as "cotifs", see e.g., Steven Pinker, "Stuff of Thoughts", https://youtu.be/5S1d3cNge24, last viewed Aug. 20, 2020. The size of a cotif is defined as a cognitive resolution unit, hereinafter referred to as "CRU" which is similar to a size of a picture cell or a pixel in digital image technique. A cotif is a "specious present" or an interval of about three seconds that correspond to human's sense of nowness. In other words, this is a duration of a deliberate action such as a handshake or it is a duration of a line of poetry, or a duration of a musical motif such as opening notes of Beethoven's Fifth Symphony which a person does not hear as a single note followed by another note but rather as a union, a cohere, a gestalt, and in some sense, a motif is obtained. Content and/or information is processed to generate the cognitive elements each of which include the cotif and is also linked to a background required to understand the cotif, as detailed below in various example embodiments.

Figure 1A:
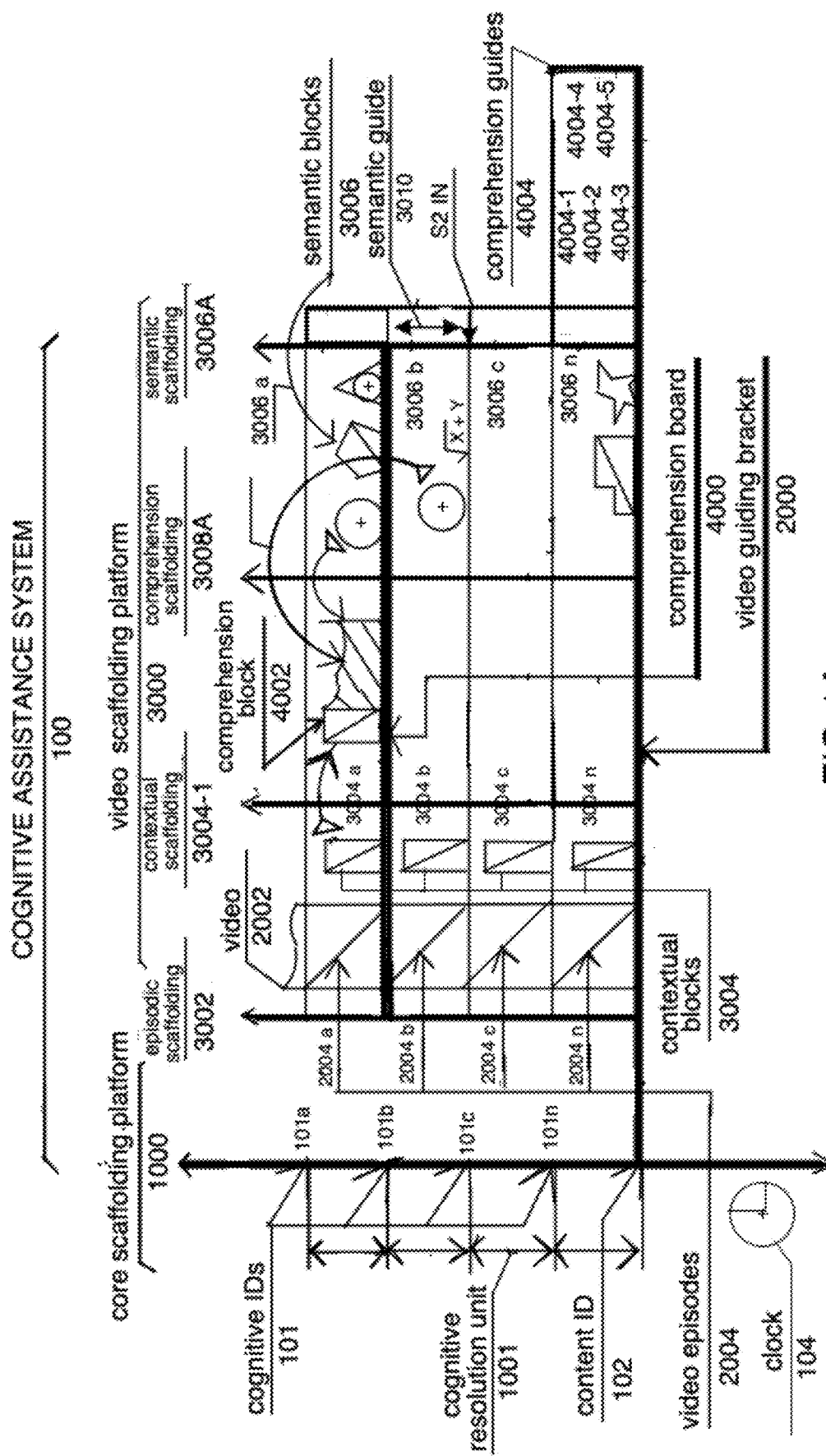
FIG. 1A-1D are views illustrating various structures of a cognitive assistance system, according to an exemplary embodiment.

FIG. 1A is a view illustrating a video structured in a cognitive assistance system 100, according to an exemplary embodiment. The cognitive assistance system 100 manages user's cognitive information using various cognitive identifiers (the cognitive IDs 101) and is a backend time-framed structure for structuring, processing, managing and maintaining user's content.

The cognitive assistance system 100 includes a core scaffolding platform 1000, a video guiding bracket 2000, video scaffolding platform 3000, comprehension guides 4004, semantic guide 3010, and a comprehension board 4000. These platforms provide templates for uniquely structuring and linking information and/or content for comprehension and understanding, specific or individual to each user, as explained in further detail below.

Various information and/or content may be obtained from an environment of a user, downloaded from a network (data network), and/or generated by a user, see e.g., U.S. Pat. No. 10,367,931 to Nguyen and U.S. Pat. No. 10,664,489 to Nguyen, incorporated herein by reference in their entireties for their helpful content. While exemplary embodiments describe information and/or content as being multimedia data, the inventive concept is not limited thereto and the information and/or content may be video, audio, text, images, and/or some combination of the foregoing.

The core scaffolding platform 1000 relates to a main timeline of user's experience. User's experience is a content type A. User's experience includes user's presence through a phenomenon, a process, an object, an environment, or an event in the real world that occurs around the user in real-time, e.g., during the course of user's life, a user's experience, explained in detail below with reference to FIGS. 1B and 1D. The core scaffolding platform 1000 includes a plurality of time points. The time points are equidistant from one another and are stamped onto the main timeline such that each time point corresponds to a start and/or an end of a cognitive resolution unit (CRU) 1001.

In an exemplary embodiment, the CRU 1001 is an average time that a person speaks an average-length complete sentence at an average speed (see e.g. U.S. Pat. No. 10,664,489, noted above). The CRU 1001 may be determined from one second to five seconds. The CRU 1001 is determined based on the average time for transferring an episodic thought in the Broca's area of a human brain into a semantic block and expressing the episodic thought in a form of language as a complete sentence e.g., a sentence with subject, verb, and object such as a duration of a line of a poetry. The CRU 1001 is 2.16 seconds or 2 seconds, for example.

Each CRU 1001 is identified by having a respective cognitive identifier or one of cognitive IDs 101, the time point at the beginning thereof. For example, in FIG. 1, the cognitive IDs 101a, 101b, 101c, . . . , 101n are respectively assigned to each CRU 1001. The distance between two consecutive cognitive IDs 101 is identical and equal. The distance between consecutive cognitive IDs 101 is equal to a length of the CRU 1001. The cognitive IDs 101 are time-coded with format such as yyyy-mm-dd-hh-mm-ss where yyyy stands for a year, mm stands for month, dd stands for the day, hh stands for an hour, mm stands for minutes, and ss stands for seconds based on an internal clock 104. For example, a cognitive ID 101a may be "2020-03-29-14-14-14" which represents Mar. 29, 2020 at 2:14 pm, 14 seconds.

By way of a metaphor, the core scaffolding platform 1000 is a tree trunk that connects branches (content) together. According to various exemplary embodiments, there may be different branches with different lengths that connect to the tree trunk at different connecting points or two branches that connect to the tree trunk at approximately same point but point in different directions, as further explained below with reference to the video guiding bracket 2000 and the video scaffolding platform 3000.

Each content input into the cognitive assistance system 100 is assigned a content identifier (ID) 102. The content ID 102 is also in a form of a date and a time stamp based on the internal clock 104. A video 2002 is assigned a respective content ID 102. The content ID 102 is a connecting point that connects the video guiding bracket 2000 to the core scaffolding platform 1000. The content ID 102 may be auto-generated or user selected. The content ID 102 may be a real time point or determined from another content ID 102 depending on a content type, as detailed below.

In FIG. 1A, the video guiding bracket 2000 is a cognitive-reference base for the video scaffolding platform 3000, and the comprehension guides 4004. The video guiding bracket 2000 is a guiding platform for guiding cognitive traffic e.g., videos and other content, within the video scaffolding platform 3000 and the cognitive traffic between the video scaffolding platform 3000 and the core scaffolding platform 1000, as explained in further detail in FIGS. 2 and 4.

Each new content such as the video 2002 is further transformed into a cognitive format using the video scaffolding platform 3000, detailed below with reference to FIG. 3. The video scaffolding platform 3000 is also like branches developed based on the video guiding bracket 2000, as explained in further detail in FIG. 2.

Figure 1B:
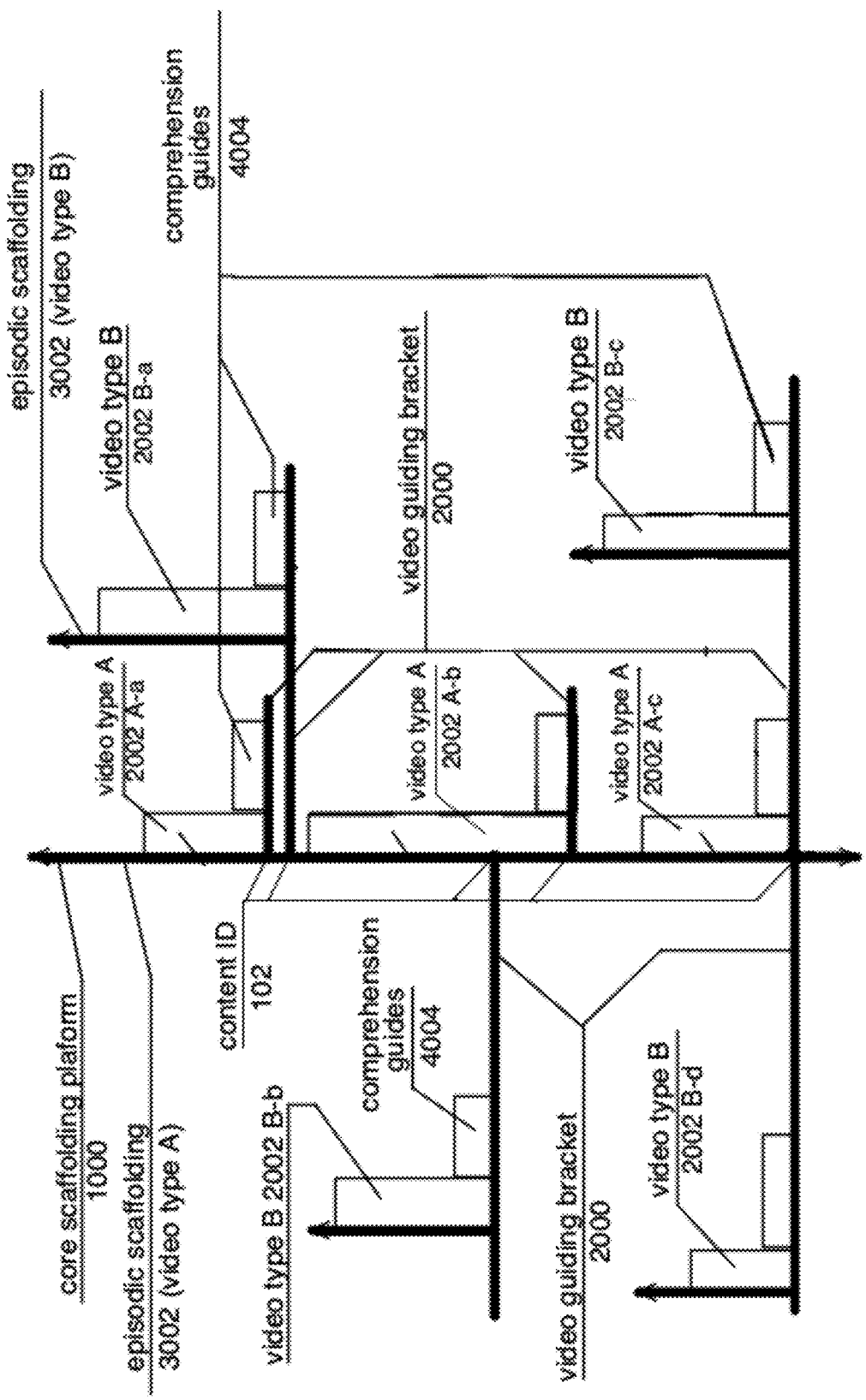

Still referring to FIG. 1A but now together with FIG. 1B, various videos connected to the core scaffolding platform 1000 are shown, according to an exemplary embodiment. That is, content includes user videos of various types such as a first video (video type A 2002 A-a), a second video (video type A 2002 A-b), and a third video (video type A 2002 A-c,) of a video type A and a fourth video (video type B 2002 B-a), a fifth video (video type B 2002 B-b), a sixth video (video type B 2002 B-c), and a seventh video (video type B 2002 B-d) of a video type B. These are provided by way of an example only and not by way of a limitation. One of ordinary skill in the art would readily appreciate that while exemplary embodiment describes video types, the techniques presented herein are applicable to other content and may be grouped as a content type A based on user's experience and a content type B based on additional content.

As noted above, the video type A identifies video or videos that include user's experience. In the cognitive assistance system 100, the video type A is defined as an episodic video. The videos type A includes real events, phenomena that occurs with the user, an experience that the user is living through (not including communication), and belongs to a user episodic database or user's experience. In an exemplary embodiment, a video of the videos type A can be generated from a plurality of consecutive episodic images and/or videos of a user captured in real-time. As is known in the art, personal galleries in our mobile devices include a plurality of images and videos of the videos type A arranged in chronological order. For example, one segment of a gallery may include five sub-segments:

1) [100 photos]—2) [video 1-30 minutes in length]—3) [200 photos]—4) [video 2-10 minutes in length]—5) [55 photos].

In the cognitive assistance system 100, the pluralities of photos are grouped and/or organized according to a predetermined schema. Each group is separated from the next group by a video. Typically, the gallery data in an example above may be structured in the following format:

photo group 1—video 1 (30 minutes)—photo group 2—video 2 (10 minutes)—photo group 3.

A group of photos is transferred into a photovideo i.e., converted into a video format. A photovideo is a video that includes a plurality of consecutive two-second episodes e.g., a two-second slideshow of a particular photo. The photos are consecutively displayed. The time of display for each photo is two seconds. The gallery for the above example is transferred to a cognitive format:

photovideo 1 (3 minutes, 20 seconds)—video 1(30 minutes)—photovideo 2 (6 minutes, 40 second)—video 2 (10 minutes)—photovideo 3 (1 minute, 50 seconds). That is, for each photo, two seconds of the photovideo is generated such that 100 photos times 2 seconds become a photovideo of 200 seconds or 3 minutes, 20 seconds. Total length of the gallery is equal to (3 minutes 20 seconds+30 minutes+6 minutes 40 seconds+10 minutes+1 minute 50 seconds) or 51 minutes, 50 seconds. The episodic scaffolding 3002 of the video type A is the same as the core scaffolding platform 1000, as shown in FIG. 1B.

In an exemplary embodiment, a video type B is defined as a semantic video or a learning video. The videos type B includes videos received from the internet and/or other sources. They may include communication data, events, phenomena not surrounding the user and not part of the user's living experience. The episodic scaffolding 3002 for the videos 2000B-a through B-d of the video type B is not part of the core scaffolding platform 1000 but is only linked to the core scaffolding platform 1000 at the content ID 102. In other words, for the video type B, the real time of the videos 2002B-a through B-d are ignored. Instead, the content ID 102 is used to link the videos 2002B-a through B-d to the video 2002A-a through A-c. As such, the episodic scaffolding 3002 of the video type B is separate from the core scaffolding platform 1000. For example, the content ID 102 is set to 2020-01-01-00-00-00 and is assigned for the video type B 2002B-a which has 2019-01-01-00-00-00 as the metadata. The content ID 102 for the video type B will differ from one user to another user depending on when it is input into the cognitive assistance system 100 of the respective user, and how the video type B relates to content of the video type A that is existing in the core scaffolding platform 1000 of the respective user.

The content ID 102 for each of the videos 2002A-a through A-c of the video type A are real-time timepoints, whereas the content ID 102 for each of the videos 2002B-a through B-d are calculated based on when they are input into the cognitive assistance system 100 and/or are designated by the users based the content ID 102 of the related content of the video type A present in the core scaffolding platform 1000. The real-time timepoints (absolute time) of the video type B are ignored and the video guiding bracket 2000 is an adaptor to convert an original real-time timepoints of the video type B to a respective identifier in the user's database using the content ID 102 plus the relative time (e.g., the length from the start point to the current point).

In an exemplary embodiment, content in language forms which is generated by a human, such as communication content, teaching-learning content, content on Internet, and so on, may be semantic content e.g., video type B. Further, episodic content of a person may not be considered as episodic content of another person. For example, a mountain climbing video captured by Maria sent to Jane is considered as Maria's episodic content e.g., video type A for Maria. However, it becomes Jane's semantic content (video type B for Jane) because Maria mostly conveyed her own ideas about her event. The video is not Jane's real event.

Figure 1C:
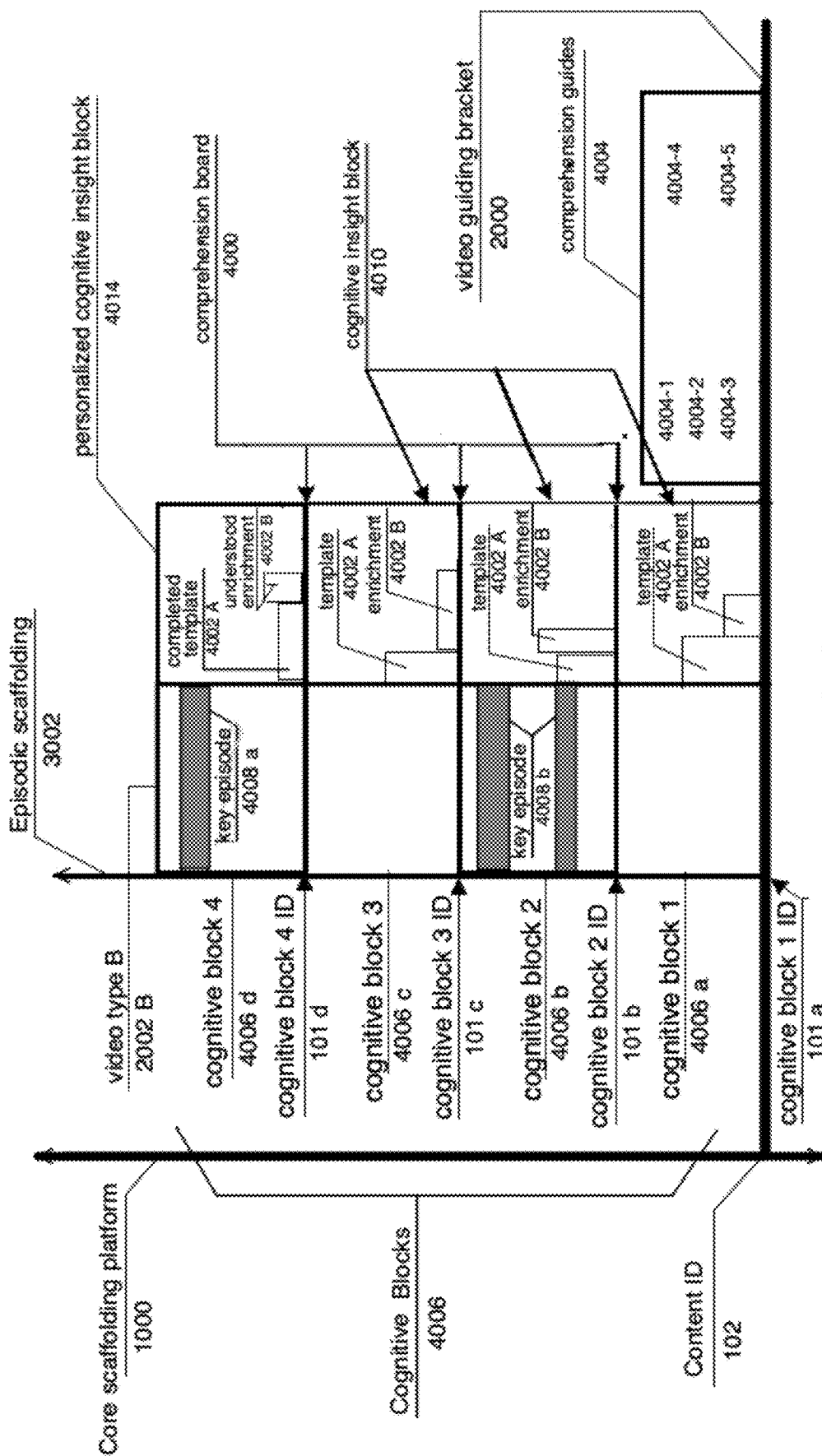

Now turning to FIG. 1C but still with reference to FIGS. 1A and 1B, the cognitive assistance system 100 divides a video 2002 into user-defined parts or cognitive blocks 4006 including a plurality of episodic blocks. In FIG. 1C, the video 2002B is content of the video type B. Accordingly, the episodic scaffolding 3002 is separate from the core scaffolding platform 1000. Templates 4002A and enrichment 4002B are attached to each of the cognitive blocks 4006, as shown. The templates 4002A and enrichment 4002B are further developed on the comprehension board 4000 to form comprehension blocks e.g., a comprehension block 4002 (FIG. 1A).

Figure 1D:
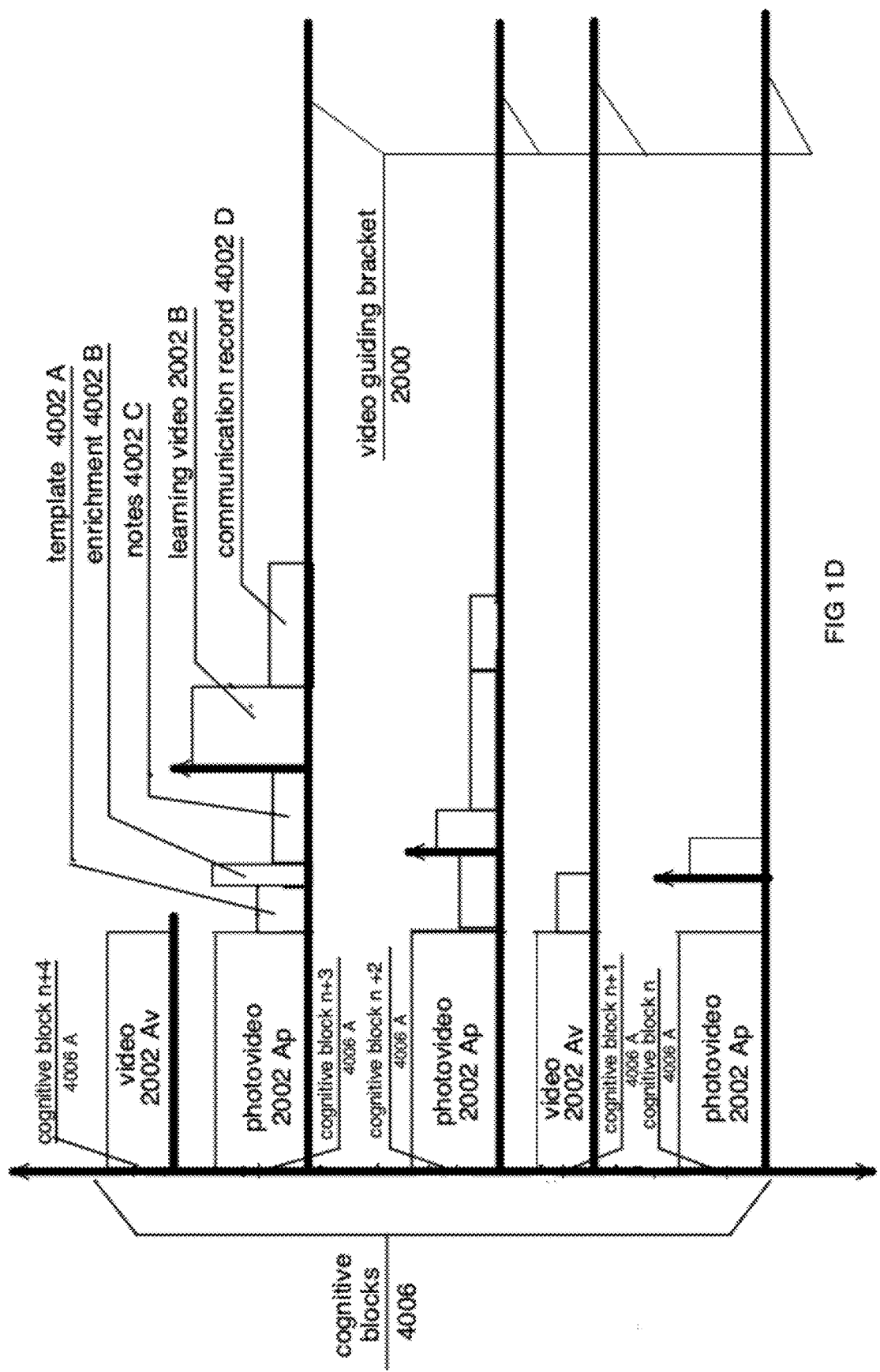

With reference to FIG. 1D but still referring to FIGS. 1A-C, a segment of a gallery of a user is structured into a cognitive structure and/or is mapped onto the cognitive assistance system 100. In FIG. 1D, the segment of the gallery includes two videos of the videos type A (video 2002 Av) and three photovideos of the videos type A (photovideo 2002 Ap). Photovideos are videos that include a plurality of consecutive two-second episodes (e.g., one CRU 1001 slideshow of a particular user's photo or photos). In an exemplary embodiment, photovideos and the two videos of the videos type A are also divided into cognitive blocks 4006 in an analogous way to the videos of the video type B explained above with reference to FIG. 1C.

In an exemplary embodiment, in FIG. 1D, a photovideo which embodies less than 100 photos (3 minutes and 20 seconds in length) is considered one cognitive block 4006A and/or one chapter in the gallery. A plurality of consecutive videos and photovideos create a user experience database. The user experience database is constructed around the core scaffolding platform 1000. Each cognitive block 4006A (experience block) may be enriched with templates 4002A, enrichment 4002B, notes 4002C, communication 4002D, and a learning video (a video 2002B of the video type B in FIG. 1C).

The cognitive assistance system 100 attaches secondary data such as the learning videos (video 2002B of the video type B), communication 4002D, and other semantic information to the core of user's experience. Thereby, it helps a user organize a coherent cognitive database, building comprehension, improving the efficiency of problem-solving and decision-making.

The above is one example of classifying, organizing, and managing personal information based on user experiences, comprehension levels, and information available. The above techniques are provided by way of an example only and not by way of a limitation.

Figure 2:
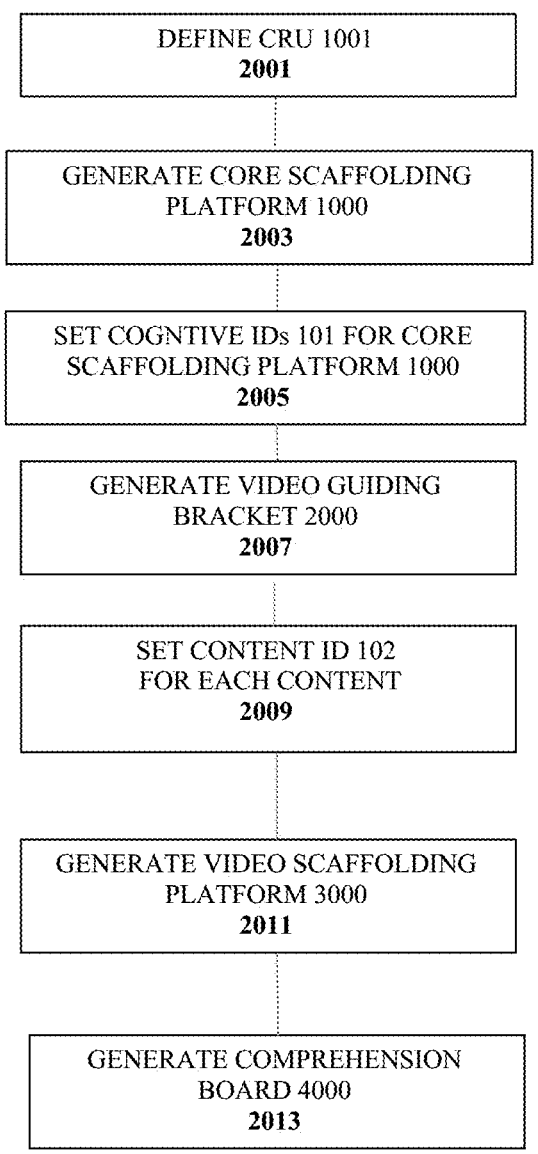
FIG. 2 is a flowchart illustrating a method of generating cognitive scaffoldings, according to an exemplary embodiment.

Still referring to FIGS. 1A-D but now together with FIG. 2, generally, in the depicted exemplary embodiment, various cognitive scaffoldings are generated for the cognitive assistance system 100.

In operation 2001, the CRU 1001 is defined. As detailed above, the CRU 1001 is an average time that a person speaks an average-length sentence at an average speed (see e.g. U.S. Pat. No. 10,664,489). The CRU 1001 is on average defined to be between one to three seconds but is not limited thereto. Each CRU 1001 is same length and serve as a basic block for contents in the cognitive assistance system 100. Each content (e.g., the video 2002 of various types) is structured or divided into video episodes 2004 (FIG. 1A) where each episode is same length as the defined CRU 1001. For example, the video 2002 is divided into video episodes 2004a, 2004b, 2004c, . . . , 2004n.

In operation 2003, the core scaffolding platform 1000 is generated. The core scaffolding platform 1000 is a reference system for managing personal database, which includes user's experience, learning, and understanding. The core scaffolding platform 1000 is generated to establish coherence for user's database and supports user's thinking based on context and evidence. The core scaffolding platform 1000 and the video scaffolding platform 3000 are generated to organize and link semantic data including learning videos (e.g., the video 2002B of the video type B) and the comprehension block 4002 with the video episodes 2004a-n including user experience videos (e.g., the video 2002A of the video type A). Various content is organized and linked in a unique structured database and includes user's learning, understanding, and experience.

As noted above, the core scaffolding platform 1000 is the tree trunk and includes the main timeline of user experience, which connects different content and different comprehensions of the user. The core scaffolding platform 1000 connects with the video scaffolding platform 3000 and then the video scaffolding platform 3000 connects with various cognitive blocks 4006 and a number of comprehension blocks (such as the comprehension block 4002). For example, when content is the video 2002 divided into the video episodes 2004, corresponding cognitive blocks 4006 and comprehension blocks (such as the comprehension block 4002) are generated and maybe in a form of text, document, photo, sketch, drawing, icon, symbol, and so on. The core scaffolding platform 1000 links these various blocks to one another using various identifiers. The core scaffolding platform 1000 is generated to link and manage personal database in both episodic and semantic content in a unique scaffolding through a cognitive ID system, which is based on discrete cognitive elements determined based on the operation 2001.

In operation 2005, cognitive IDs 101 are set for the core scaffolding platform 1000. The cognitive IDs 101 are based on the size of the CRU 1001 defined in the operation 2001. As explained above, the cognitive IDs 101 are consecutive time-coded time points that are set based on the internal clock 104. For example, if the CRU 1001 is defined at two seconds intervals, the cognitive block 1 ID 101a may be "2020-03-29-14-14-14" in FIG. 1C, the cognitive block 2 ID 101b may be "2020-03-29-14-14-16", the cognitive block 3 ID 101c may be "2020-03-29-14-14-18", the cognitive block 4 ID 101d may be "2020-03-29-14-14-20", and so on. There should be one respective cognitive ID from among the cognitive IDs 101 for each CRU 1001. In other words, when the video 2002 is divided into video episodes 2004a, 2004b, 2004c, . . . , 2004n, they are respectively set with the cognitive IDs 101.

In operation 2007, the video guiding bracket 2000 is generated. The video guiding bracket 2000 connects the video scaffolding platform 3000 to the core scaffolding platform 1000 and guides the cognitive traffic (content) in the video scaffolding platform 3000. The video scaffolding platform 3000 has one or more scaffolding components such as episodic scaffolding 3002, contextual scaffolding 3004-1, semantic scaffolding 3006A, and comprehension scaffolding 3008A on which the video 2002 is split into cognitive components (video episodes 2004a-d, contextual blocks 3004, semantic blocks 3006, and comprehension blocks such as the comprehension block 4002).

In operation 2009, the content ID 102 is set for each content. The content ID 102 corresponds to one of the cognitive IDs 101. For example, for the video 2002, the content ID 102 may have the value of a starting time point "2020-03-29-14-14-14". The content ID 102 for content of a video type B such as the video 2002B in FIG. 1B may be defined by the user. In an exemplary embodiment, the user may select to set the content ID 102 of the video 2002B of the video type B to the starting timepoint of the video 2000A which is content of a video type A e.g., link the video 2002B of the video type B to a starting point of the first video episode 2004a. For example, if the video 2002 was downloaded on March 20 at 9:00 am, the cognitive assistance system 100 may automatically selects to set the content ID 102 to "2020-03-20-09-00-00". In an exemplary embodiment, the content ID 102 of content of the video type A is set based on the date and time the content was captured or experienced by the user.

According to yet another exemplary embodiment, the content ID 102 of the video 2002B of the video type B may be user-defined based on the user's calendar or user's schedule. The cognitive assistance system 100 is configured to offer a timeline, a calendar, a time-table, etc. for the user to make a selection for the content ID 102. The user chooses the time that is most meaningful to his or her own events (content of the video 2002A of the video type A). For example, the user may define the timeline based on his or her class schedule (first class, second class, and so on).

According to yet another exemplary embodiment, the content ID 102 and cognitive IDs 101 of the video 2002A is the real-time of the event experienced and captured by the user. For example, the mountain climbing event was happening on Jan. 1, 2020, and the video was captured by Maria starts at 08:30:05, the content ID 102 for this video in Maria's core scaffolding platform 1000 is automatically set at 2020-01-01-08-30-05. However, the content ID 102 for the same video in Jane's core scaffolding platform 1000 may be assigned at 2020-03-01-20-35-15 by Jane e.g., when Jane received content from Maria. As another example, Jane may set the content ID 102 for the same video to correspond to one of the video episodes 2004 of the video 2002A in Jane's core scaffolding platform 1000.

In operation 2011, the video scaffolding platform 3000 is generated, as detailed below with reference to FIG. 3.

In operation 2013, the comprehension board 4000 is generated based on user input and the video scaffolding platform 3000.

The comprehension board 4000 is a tool to facilitate comprehension-building, problem-solving, and decision-making. The comprehension board 4000 is generated for displaying, gathering, connecting, and processing the contextual blocks 3004, semantic blocks 3006, templates 4002A, and enrichments 4002B, to develop a plurality of comprehension blocks such as the comprehension block 4002. The comprehension board 4000 may be compared to a whiteboard in a video classroom. Users (presenters/teachers/viewers/students) project the video 2002 and various content onto it, type, sketch, draw on it, save, delete, edit, share, and generate, enrich various blocks such as the comprehension block 4002. Each comprehension block 4002 is then mapped onto one of the comprehension guides 4004. The comprehension board 4000 may be deployed on a touchscreen or a tablet, which are popular among users.

Figure 3:
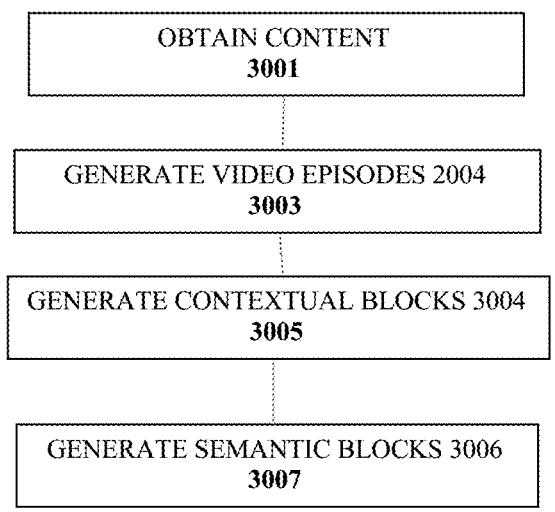
FIG. 3 is a flowchart illustrating a method of generating a video scaffolding for a video scaffolding platform, according to an exemplary embodiment.

Still referring to FIGS. 1A-2, but now together with FIG. 3, generating the video scaffolding platform 3000 is described, according to an exemplary embodiment. The video scaffolding platform 3000 includes episodic scaffolding 3002, contextual scaffolding 3004-1, semantic scaffolding 3006A, and comprehension scaffolding 3008A. The video scaffolding platform 3000 is connected to the core scaffolding platform 1000 using the content ID 102. The video scaffolding platform 3000 is a time-framed structured for transforming contents such as the video 2002 into a cognitive format. The cognitive format for the content is explained with reference to the video 2002 in FIGS. 1A-D.

In operation 3001, content is obtained. The content (e.g., the video 2002) is input into the cognitive assistance system 100. As explained above, content may be captured via a user device (generating content of a video type A) and/or uploaded from another location (generating content of the video type B) via a network such as the Internet or from a memory. The episodic scaffolding 3002 for the content of the video type B (e.g., video 2002B) is separate from the core scaffolding platform 1000. The episodic scaffolding 3002 for content of the video type A (e.g., videos 2002A) is the same as the core scaffolding platform 1000.

In operation 3003, the video 2002 is divided into video episodes 2004 based on the defined CRU 1001 (in the operation 2001 in FIG. 2). That is, the content is split into a plurality of equal video episodes 2004. The size of the video episodes corresponds to the size of the CRUs 1001 (e.g., about 2 seconds). A respective one of the cognitive IDs 101 is assigned to each of the plurality of video episodes 2004. The distance between two consecutive cognitive IDs (e.g., 101a and 101b) is identical and equal.

In operation 3005, contextual blocks 3004 (3004a-n) are generated where each of the contextual blocks 3004a-n respectively correspond to one of the video episodes 2004a-n. The contextual blocks 3004 are generated from the images in the respective episodes (see e.g. U.S. Pat. No. 10,664, 489). For example, the contextual blocks 3004 may be thumbnails or a summary of the information provided in the respective episodic block from among the video episodes 2004. Notably, each of the contextual blocks 3004 is stamped with the same one of the cognitive IDs 101 as the respective one of the video episodes 2004. For example, the cognitive ID 101a is assigned to the video episode 2004a (an episodic block) and to the respective contextual block 3004a. The cognitive IDs 101 serve as a bracing link that connect the video scaffolding platform 3000 and the comprehension board 4000 to the core scaffolding platform 1000. The video episodes 2004 are synchronized with the contextual blocks 3004.

In operation 3007, semantic blocks 3006 are generated. The semantic blocks 3006 are generated based on semantic analysis of video episodes 2004. The video episodes 2004 are analyzed using machine learning algorithms and/or speech to text converters. Meaning and key concepts are extracted from the video episodes 2004. The audio portion of the multimedia data is converted into text and parsed to obtain meaning. Semantic analysis may further include image recognition and extracting meaning from the images and/or shots and/or frames in the multimedia data. Sematic analysis may include artificial intelligence algorithms, neural networks, and other techniques known in the art or later developed. Based on the semantic analysis, the semantic blocks 3006 provide meaning of the images and audio in the respective video episodes 2004 (i.e., episodic blocks). For example, the semantic blocks 3006 may include text obtained by speech to text conversion of the audio in the respective video episodes 2004. Additionally, the semantic blocks 3006 may include a highlight of a keyword. The semantic blocks 3006 may also be sketches, symbols, and so on obtained from the meaning of the video episodes 2004 or input by the user (user-defined meaning), (see e.g., U.S. Pat. No. 10,664,489).

In FIG. 1A, semantic blocks 3006a, 3006b, 3006c, ..., 3006n respectively correspond to the video episodes 2004a, 2004b, 2004c, ..., 2004n (episode blocks) and respectively correspond to contextual blocks 3004a, 3004b, 3004c, ..., 3004n. Notably, each of the semantic blocks 3006 is stamped with the same one of the cognitive IDs 101 as the respective one of the video episodes 2004 and the contextual blocks 3004. For example, the cognitive ID 101a is assigned to the video episode 2004a (an episodic block), the respective contextual block 3004a, and the respective semantic block 3006a. In other words, the cognitive IDs 101 serve as the bracing link that connects the video scaffolding platform 3000 and the comprehension board 4000 to the video episodes 2004, the contextual blocks 3004, the semantic blocks 3006, and the comprehension block (e.g., the comprehension block 4002). By forming these blocks, the video 2002 is transformed into its cognitive format. By using the cognitive IDs 101, the video episodes 2004 (episodic blocks) are synchronized with the contextual blocks 3004 and semantic blocks 3006. Further, these blocks may be played/displayed synchronously on a display of a computer based on the cognitive IDs 101.

Figure 4:
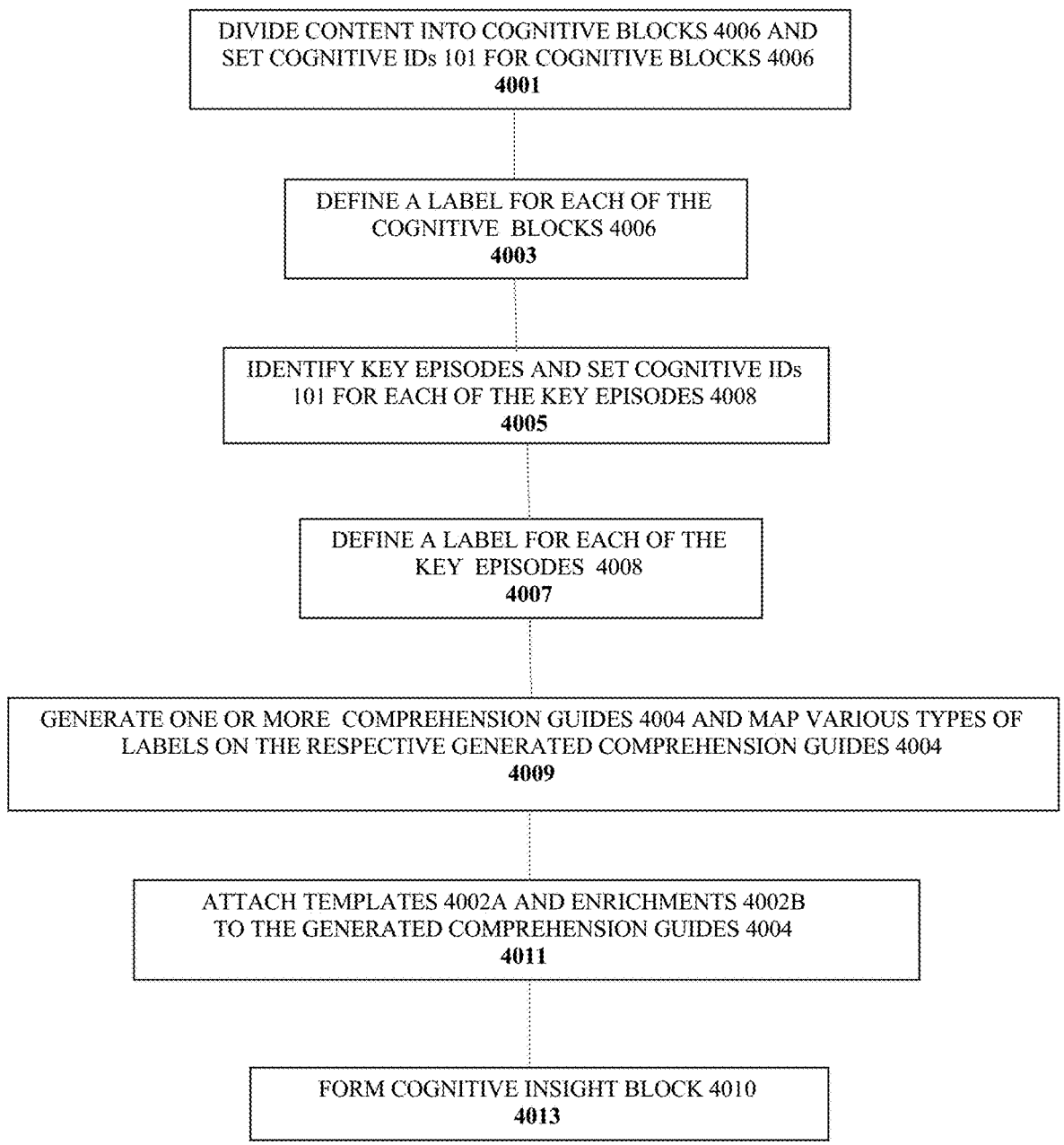
FIG. 4 is a flowchart illustrating a method of generating one or more comprehension guides, according to an exemplary embodiment.

Still referring to FIGS. 1A-2, but now together with FIG. 4 forming the cognitive blocks 4006 and key episodes 4008 (shown in FIG. 1C), comprehension guides 4004, templates 4002A, enrichments 4002B, and a cognitive insight block 4010 are now described, according to an exemplary embodiment. FIGS. 8A, 8B, and 11A-15 are views illustrating the comprehension board 4000 and the comprehension guides 4004 according to various exemplary embodiments.

In operation 4001, content is divided into user-defined parts called cognitive blocks 4006 (shown in FIGS. 1C and 1D) based on user input. In operation 4003, one or more labels are assigned for each user-defined part. Implementations of the operations 4001 and 4003 are now described, according to various exemplary embodiments.

The cognitive assistance system 100 designates one of the respective cognitive IDs 101 at the starting point of each of the cognitive blocks 4006 (FIGS. 1C and 1D). The user selects one or more of the consecutive video episodes 2004 to form a chapter. In other words, the content is divided into user-defined portions or parts, forming a user-defined structure that includes a number of cognitive blocks 4006. The length of the cognitive blocks 4006 may vary and may include more or less of the corresponding CRUs such as the CRU 1001. The length of the cognitive blocks 4006 varies based on user input.

Each of the cognitive blocks 4006 is identified by a starting time point e.g., cognitive block 1 ID 101a-"2020-03-29-14-14-14". The next consecutive part or the next cognitive block is defined by another cognitive ID e.g., cognitive block 4 ID 101d —"2020-03-29-14-33-54". In other words, the content is split into consecutive cognitive blocks 4006 of varied lengths.

Figure 11:
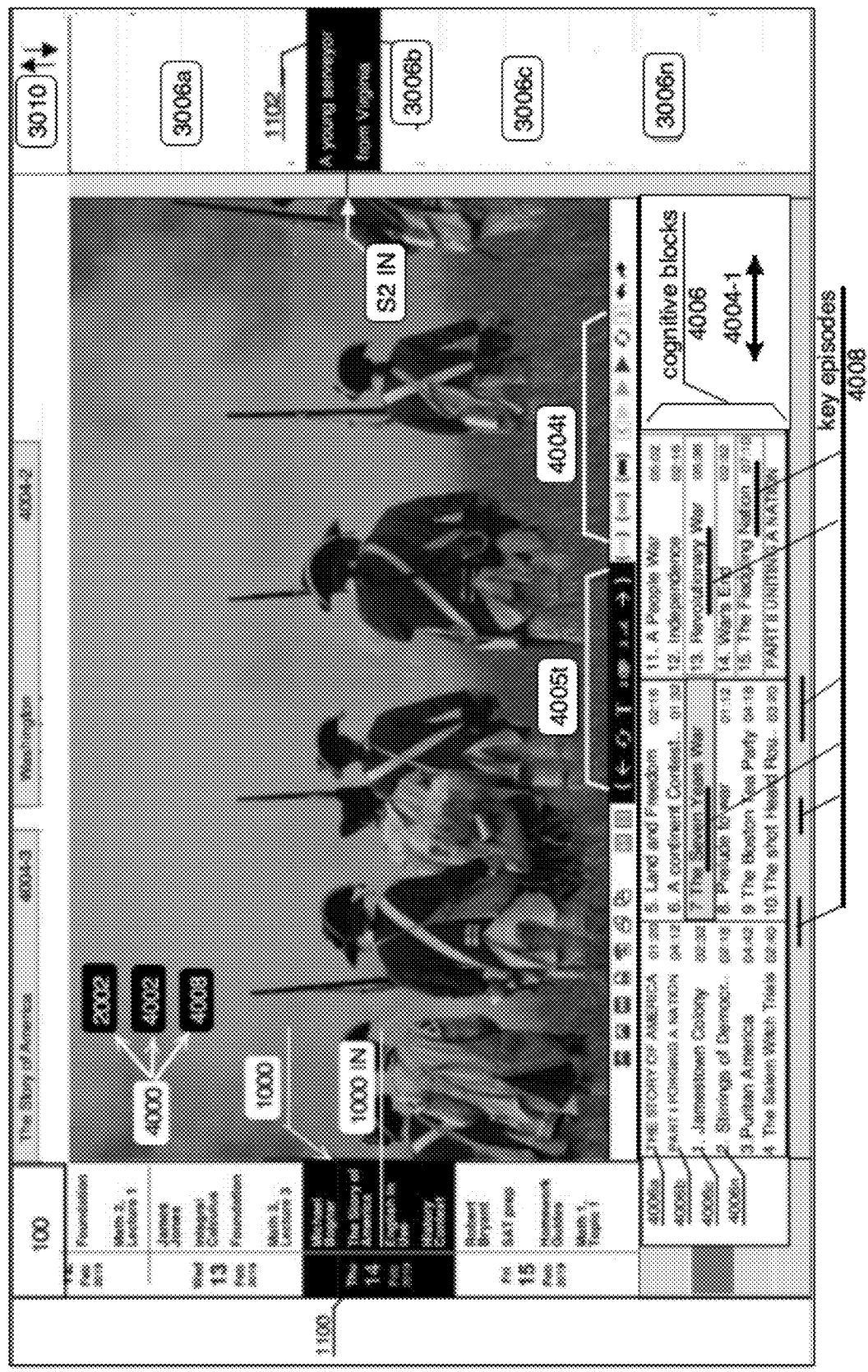
FIGS. 11A and 11B are views illustrating using comprehension guides for mastering learning, according to an exemplary embodiment.
Figure 11:
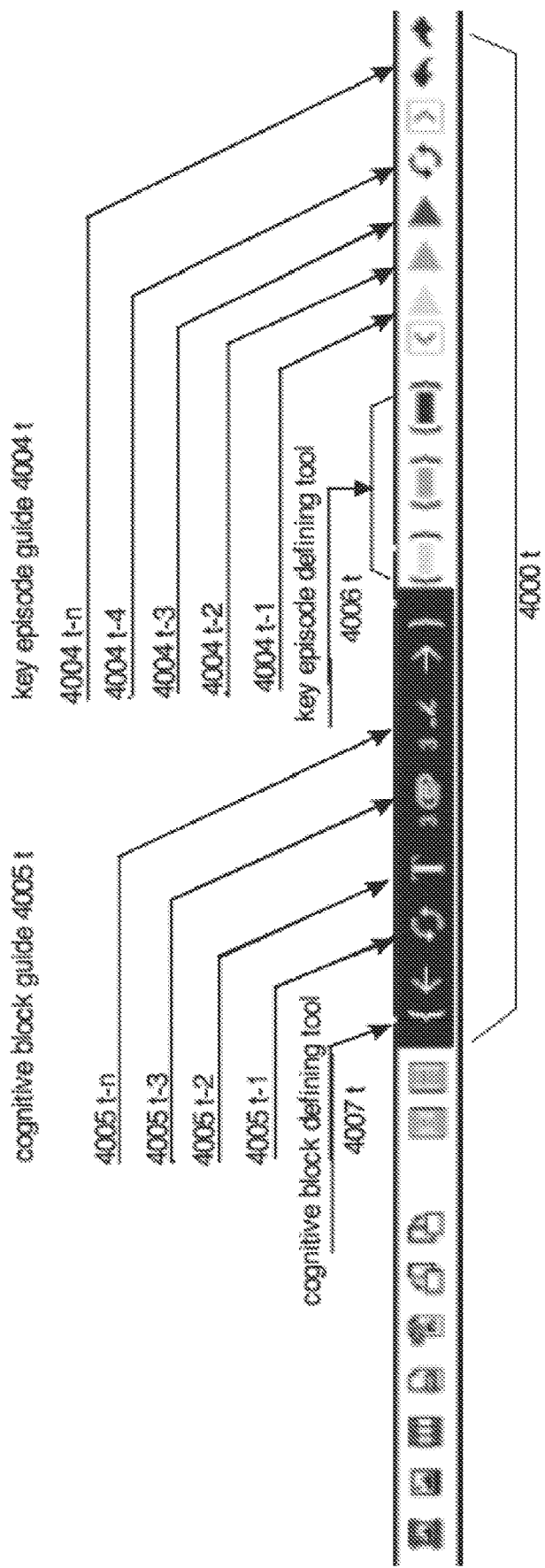
Figure 12:
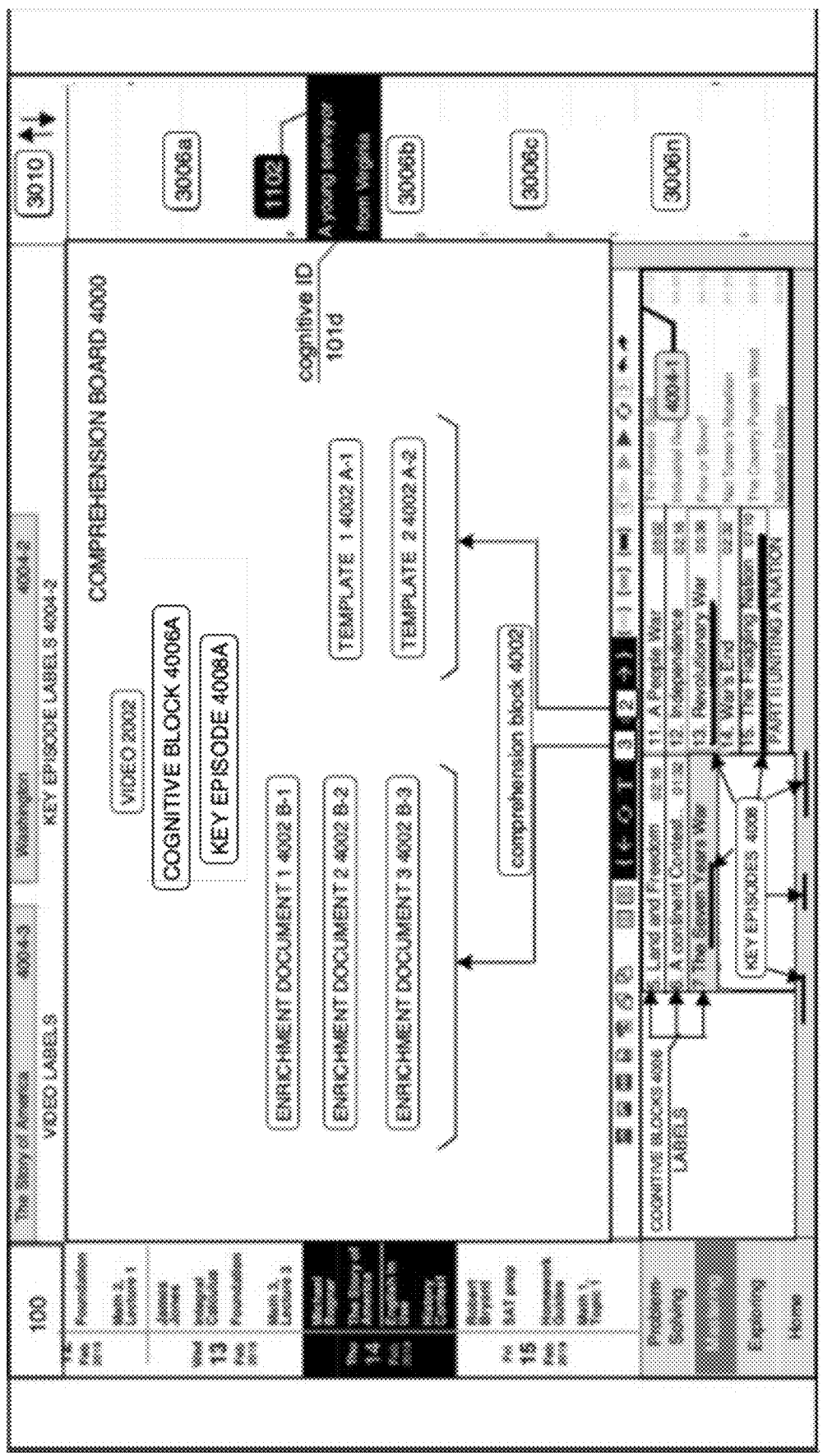
FIG. 12 is a view illustrating using enrichment document for deepening understanding, according to an exemplary embodiment.

As shown in FIGS. 11A and 12, content is divided into cognitive blocks 4006. In FIG. 11A, the first cognitive block 4006a is 1 minute, 20 seconds (1:20) in length. The cognitive block 4006a is an introduction and is assigned a label "The STORY OF AMERICA" and is assigned a cognitive ID 101a of "2020-01-01-00-00-00". The second cognitive block 4006b is 04:12 is length, is part 1 introduction, is assigned a label "PART 1: FORGING A NATION" and is assigned a cognitive ID 101b of "2020-01-01-00-01-20". The third cognitive block 4006c is 02:32 in length, chapter 1, is assigned a label "Jamestown Colony" and is assigned a cognitive ID 101c of "2020-01-01-00-05-32". The fourth cognitive block 4006n is 02:18 in length, is chapter 2, is assigned a label "Stirrings of Democracy", and is assigned a cognitive ID 101n of "2020-01-01-00-08-04". In FIG. 12, labels for the cognitive blocks 4006 include "Land and Freedom", "A continent Contest", "The Seven Year War", and so on.

A user (composer/presenter) scrolls through the semantic blocks 3006a-3006n (e.g., semantic blocks 3006 in FIGS. 11A and 12) to set a starting point and an endpoint for a user-defined part (chapter, part, topic, etc.). For example, when an indicator (e.g., in the form of a redline, a semantic indicator S2 IN in FIGS. 8A and 8B) reaches the selected semantic block 1102 in FIG. 11A, the user may click to select or choose this selected semantic block 1102. Then the cognitive assistance system 100 reads one of the cognitive IDs 101 of the selected semantic block 1102 and automatically sets it as one of the cognitive IDs 101 for a corresponding cognitive block (corresponding to the selected semantic block 1102) from among the cognitive blocks 4006. Additionally, the user may be presented with a user interface to input the label for the cognitive blocks (the selected semantic block 1102), e.g., directly in a comprehension guide 4004 (the first comprehension guided 4004-1 in FIGS. 1A and 8A) or in a dedicated user input field depending on a particular implementation of the cognitive assistance system 100.

Figure 8A:
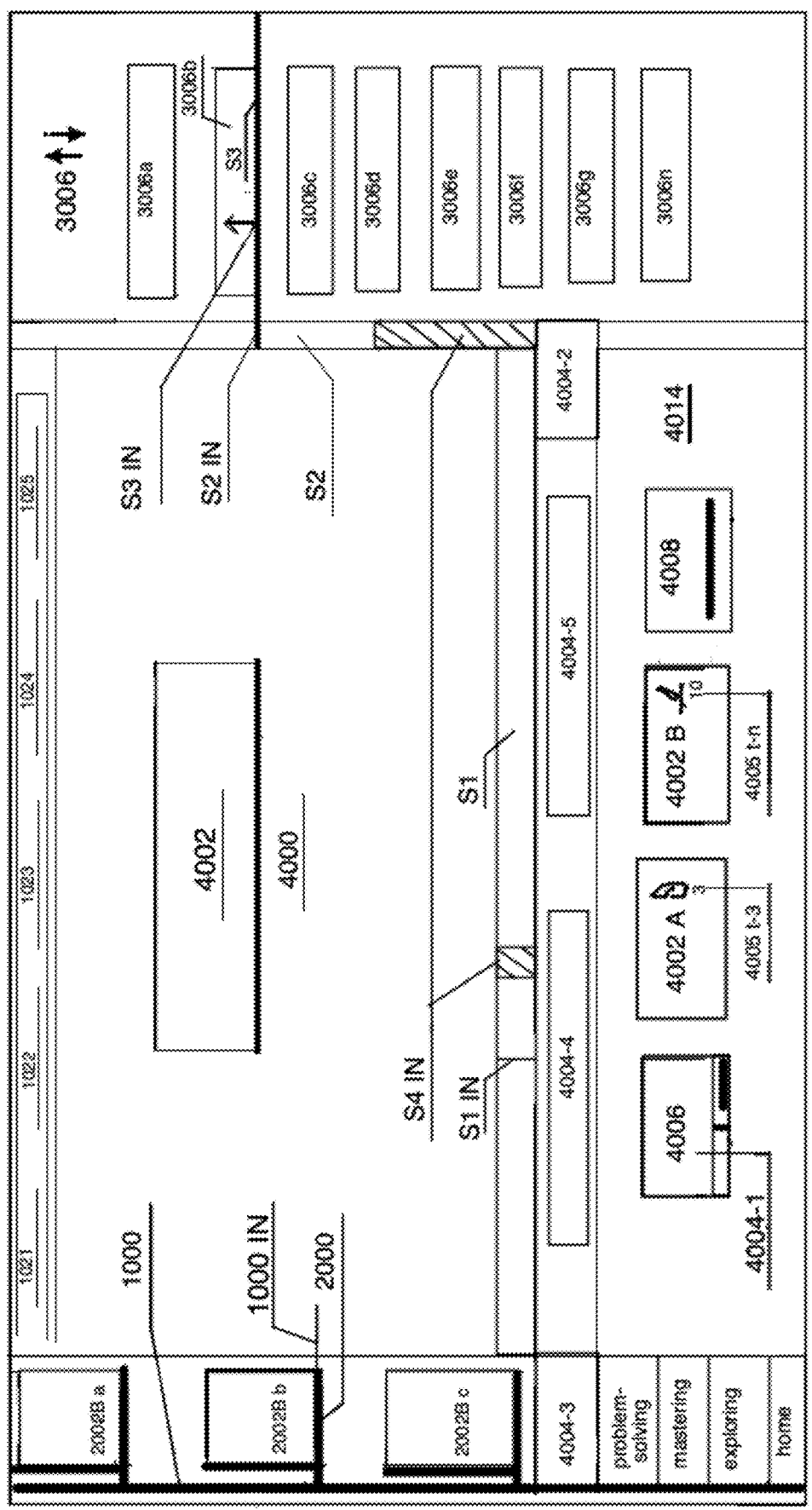
FIG. 8A is a block diagrams illustrating using a learning video for building comprehension blocks and solving problems. according to an exemplary embodiment.

For example, in FIG. 12, the user designates a starting point for a chapter by scrolling the semantic guide 3010 until the semantic block 1102 "A young serveyor from Virginia" is at a redline, the semantic indicator S2 IN shown in FIG. 11A. Next, the user may input a designated key such as pressing "enter." The cognitive assistance system 100 stores a cognitive ID 101d of the respective semantic block 1102 as an identifier of the current chapter. After designating the location or timepoint, the user may select "The Seven Years War" as the label for the selected chapter and input it onto the first comprehension guide 4004-1 (FIGS. 1A and 8A). Thereafter, when users select the label "The Seven Years War," the cognitive assistance system 100 jumps to that designated starting point for the semantic block 1102. That is, the video 2002 is played from the timepoint of the semantic block 1102 "A young serveyor from Virginia".

This particular implementation is provided by way of an example only and not by way of a limitation. One of ordinary skill in the art would readily appreciate that while an exemplary embodiment is described with reference to the presenter, one or more viewers may generate their own comprehension guides with individually defined durations and labels (e.g., understood topic, brief review required, study more, and so on).

Additionally, one or more labels are assigned to one or more of the cognitive blocks 4006. Labels may be a hierarchical structure and may be of various types. Specifically, labels are generated, edited, and/or deleted by a user. Labels are preferably chosen based on viewers' prior knowledge so that the viewers easily recognize them.

There are various types of labels. A first label is a user-defined title of a part or may be a cue to introduce a key point to guide viewers to the key ideas of the part. The first label of one cognitive block (not shown) from among the cognitive blocks 4006 is mapped onto a first comprehension guide 4004-1 (FIGS. 1A and 8A). For example, the video 2002 is set as one cognitive block (not shown) and the first label for the video 2002 includes an author, a title, a topic, and a subject. The first label of the video 2002 is mapped onto a third comprehension guide 4004-3 (FIGS. 1A and 8A). A second label may be a corresponding contextual block 3004*b* from among the contextual blocks 3004. For example, the contextual blocks 3004 may images corresponding to the plurality of video episodes 2004. Accordingly, when the video 2002 is paused and/or the user moves to the first label, the second label in a form of the contextual block 3004*b* is displayed on the comprehension board 4000.

Further, when the second label in a form of the contextual block 3004*b* for the video 2002 is displayed from among a plurality of consecutive contextual images in the video 2002, the user chooses the best representative image to be the second label for the video 2002. When the video 2002 is paused, the user scrolls the first label of video 2002 to the redline indicator 1000IN (FIG. 8A), and the second label is displayed on the comprehension board 4000.

In FIGS. 11A and 12, there are a plurality of consecutive chapters for the video "The Story of America": Chapter 1, with the label "Jamestown Colony," Chapter 2 with the label "Stirring Democracy," and chapter 3 with the label "Puritan America,". Chapter 1 consecutively links with chapter 2, 3 . . . and chapter 15 in a chronological order.

In an exemplary embodiment, the content creators may be the presenters and/or teachers. They define labels for the chapters related to principles, causes, and/or roots to guide the learners/viewers to further applications and effects presented in the respective cognitive blocks 4006. Those pathways guide the learners/viewers to learn and quickly understand a new concept and then solve a problem or answer the topic related question more effectively, as described in further details in FIGS. 6 and 7.

In an exemplary embodiment, the cognitive assistance system 100 automatically detects time, place, and duration and uses the detected metadata for initially labeling videos and photovideos of the videos type A. The first label of a chapter, a photovideo (videos type A), includes the date/time of the first photo and last photo in that chapter. For example, the format for the first label of a photovideo is: yy-mm-dd (space)=(space) yy-mm-dd such as 20-07-01=20-07-07. It represents that the first photo of the 100 photos in this chapter was shot on Jul. 1, 2020, and the 100th photo of 100 photos in this chapter was shot on Jul. 7, 2020. The second label of a chapter of this photovideo is the best representative for the photos in this chapter. For example, the 14th photo of 100 photos of this chapter is selected by the user.

The first label of the video 2000A of the videos type A includes the date/time of the start time of that chapter. The format for a label of a video chapter is: "yy-mm-dd(space): (space) hh:mm:ss". For example, the first label for chapter 2 is "20-06-31-08:20:14." It represents that the video was shot at 08:20:14 on Jun. 31, 2020. The duration of the video e.g., 30 minutes and 00 seconds, will also be displayed on the comprehension guides 4004. Other information such as title, subject, or topic is defined and added to the label of the chapter.

The user may replace the labels of the cognitive blocks 4006 by keywords that are more meaningful than the date/time of the events.

According to one or more example embodiments, various types of labels are set and displayed on various comprehension guides 4004-1 . . . 4004-5. For example, a first label type corresponds to semantic cues and a second label type corresponds to contextual labels or targets and are displayed on the comprehension board 4000. In another variation, the first label type relates to the metadata of the video 2002, the second label type relates to metadata of the video episodes 2004 (e.g., keywords), a third label type relates to a semantic meaning of the video episodes 2004, a fourth label type relates to user-defined labels and so on. Each label type respectively forms its own comprehension guide from among the comprehension guides 4004. These are just some examples of the label types and are not provided by way of a limitation.

In operation 4005 and 4007, one or more key episodes 4008 in one of the cognitive blocks 4006 are detected (e.g., highlighted/emphasized) and labeled.

In an exemplary embodiment, the system designates one of cognitive IDs 101 as a starting point of each of the key episodes 4008. The users that define key episodes 4008 and labels are content creators but as noted above, the viewers/learners may define their own key episodes 4008 and/or set respective labels. The user may link various key episodes 4008 (FIG. 12) using a label. In FIG. 1C, two key episodes 4008*a* and 4008*b* are linked together using a keyword label. In this case, the user guides the viewers to understand a key idea or a key concept in different contexts throughout the video 2002.

In an exemplary embodiment, the user designates key episodes 4008 and creates labels for the key episodes 4008 in the same way as they designate chapters (the cognitive blocks 4006) and their labels. For example, using a semantic guide 3010, the user browses (scrolls up and down) various semantic blocks 3006*a-n* (FIGS. 8A, 11A, and 12). The user uses various tools 4000*t* (shown in FIG. 11B) to navigate, set, define, and designate various key episodes 4008 and form labels and comprehension guides 4004-1 to 4004-5.

Specifically, in FIG. 11B, tools 4000*t* for performing various operations such as the operations in FIG. 4, are provided. The tools 4000*t* include a key episode guide tool set 4004*t*, a cognitive block guide tool set 4005*t*, a key episode defining tool set 4006*t*, and a cognitive block defining tool set 4007*t*. The cognitive block defining tool set 4007*t* includes tools to designate the starting point and the endpoint for each user-defined part, e.g., the left bracket for the starting point and the right bracket for the endpoint) together with the semantic guide 3010 for selecting the semantic blocks 3006. Accordingly, it is easy and convenient for the user to split content into various portions and/or form hierarchical user-defined structures for the content. The users need not have any special skills or knowledge.

In FIG. 11B, a key episode guide tool set 4004*t* includes tools 4004*t*-1, 4004*t*-2, 4004*t*-3, 4004*t*-4, and 4004*t*-5 to play and learn the key episodes 4008. While the key episode defining tool set 4006*t* is to designate, adjust, and edit starting points and endpoints for the key episodes 4008 by working together with the semantic guide 3010, the tool 4004*t*-1 is to consecutively play the key episodes 4008 highlighted with only a first color-code (e.g., red color only), the tool 4004*t*-2 is to consecutively play key episodes 4008 highlighted with only a second color-code (e.g., blue color), the tool 4004*t*-3 is to consecutively play key episodes 4008 highlighted with only a third color-code (e.g. green color), the tool 4004*t*-4 is to repeatedly play the current episode from among the key episodes 4008, and the tool 4004*t*-*n* is to play a plurality of key episodes 4008 with the same label. These are provided by way of an example only and not by way of a limitation. The key episode guide tool set 4004*t* may be adjusted and change based on a number of label types, for example.

The cognitive block guide tool set 4005t includes tools 4005t-1, 4005t-2, 4005t-3, 4005t-4, and 4005t-5 and is used by the user to navigate, learn, and work with a particular chapter or one or more of the cognitive blocks 4006. The cognitive block defining tool set 4007t (left and right bracket icon) is to adjust, edit the assignment of the starting point and the endpoint of a chapter by also using the semantic guide 3010 and the redline S2 IN. The cognitive block tool 4005t-1 is to reiterate or repeat a chapter or some other user-defined part (one of the cognitive blocks 4006). The cognitive block tool 4005t-2 enables the editing of the labels of the chapters and/or user-defined parts and the cognitive block tool 4005t-3 indicates the number of enrichments (FIG. 12) in the chapter, and are to attach and open the enrichments 4002B. The tool 4005t-n indicates the number of templates 4002A in the chapter, and to attach and open the templates 4002A (FIG. 12).

The key episode defining tool set 4006t includes brackets with a rectangle for designating the starting point and the endpoint of a key episode (FIG. 12), using the cognitive IDs 101, and using one of the comprehension guides 4004 for scrolling through keywords and labeling the key episodes 4008.

These tools are provided by way of an example only and not by way of a limitation.

For example, in FIGS. 11A and 12, the key episodes 4008 center around "Washington" and are labeled by the keyword "Washington," and are emphasized or identified via, for example, highlighting or color-coding (e.g., orange color-code). The key episodes 4008 labeled "Washington" are highlighted inside several different ones of the cognitive blocks 4006 (chapters) at different locations such as chapter 7—The Seven Year War, chapter 13—Revolution War, and chapter 15—The fledgling Nation.

The label "Washington" is chosen by the user (presenter) who wants to emphasize and present the key role of "Washington" in "The Seven Years War," "Revolution War," and "The Fledgling Nation."

In operation 4009, the cognitive assistance system 100 generates one or more comprehension guides 4004 and maps various types of labels on the respective generated comprehension guides 4004. That is, one type of label is mapped on one of the comprehension guides 4004. By way of an example, mapping of the key episodes 4008 on a comprehension guide 4004-2 is described below.

In FIGS. 8A, 8B, 11A, and 12, the key episodes 4008 are emphasized e.g., highlighted, underlined, color-coded on the timelines S of the video, and the timelines of chapters S4 IN indicate the locations of the key episodes 4008. A label of the key episodes is mapped onto the second comprehension guide 4004-2.

The users that define key episodes 4008 and labels may be viewers and/or learners. They may define their own key episodes 4008 and their respective labels related to their own importance so that they can quickly find and use them in the future. Based on a type of label generated, a respective comprehension guide is generated. The users select different color-codes for the highlights of their own key episodes 4008. FIG. 12 illustrate a comprehension guide 4004-1 generated by the user.

Unlike the cognitive blocks 4006 that are consecutively linked together, the key episodes 4008 are not linked in a consecutive order. The key episodes 4008 are located in distant places and are linked via the same label.

Optionally, the user may be provided with a suggestion for the label. For example, user-defined starting point and endpoint for a new cognitive block 4006a is obtained. The cognitive block 4006a is then semantically analyzed to extract keywords, semantic meaning, and so on and various labels may be suggested to the user. For example, corresponding contextual blocks 3004a-n and semantic blocks 3006a-n may be analyzed using artificial intelligence to suggest an appropriate title for the user defined part (the cognitive block 4006a).

As another variation, the newly generated cognitive block 4006a may be analyzed to determine presence or absence of enrichment content, explained in detail below. In response to determining that enrichment content (e.g., homework assignment and/or additional definition) exist and are linked to this cognitive block 4006a, the cognitive block 4006a may be displayed in a different manner. e.g., emphasized and/or highlighted or a particular label type maybe generated (e.g., block has enrichment content).

As another variation, the comprehension guides 4004 may be color-coded based on whether the respective cognitive block includes a key concept, an assignment for the user to complete on the comprehension board 4000. Additionally, when the enrichment content is completed (assignment completed), the respective cognitive block may assume a different color and when the enrichment content is submitted, the respective cognitive block may again change color.

These variations are provided by way of various examples and not by way of a limitation.

Referring back to the operation 4009, the second comprehension guide 4004-2 includes the labels of key episodes 4008, such as "Washington". Additionally, the second comprehension guide 4004-2 may further include cues. For example, the presenter may input a cue of "First President". The cue "First President" will be associated with "George Washington" in the comprehension-integrated video 1100 (FIG. 11A). One or more viewers may feel more comfortable to search for the "first President" instead of "George Washington". Accordingly, in the example of FIGS. 11A and 11B, using the cognitive block guide tool set 4005t and/or the key episode guide tool set 4004t, the user may search the integrated video 1100 using the keywords which are not listed as labels of the key episodes 4008 and these synonyms or other user-defined terms can be input into a search field for searching one or more of the comprehension guides 4004 e.g., searching for a point inside the content of the integrated video 1100.

Still in operation 4009, a third comprehension guide 4004-3 is generated. The third comprehension guide 4004-3 may include a respective video searching box and a respective video label "The Story of America". When a user types a keyword into the respective video searching box (e.g., 4004-3 in FIGS. 11A and 12), a list of videos related to that keyword is displayed on the core scaffolding platform 1000.

Figure 13:
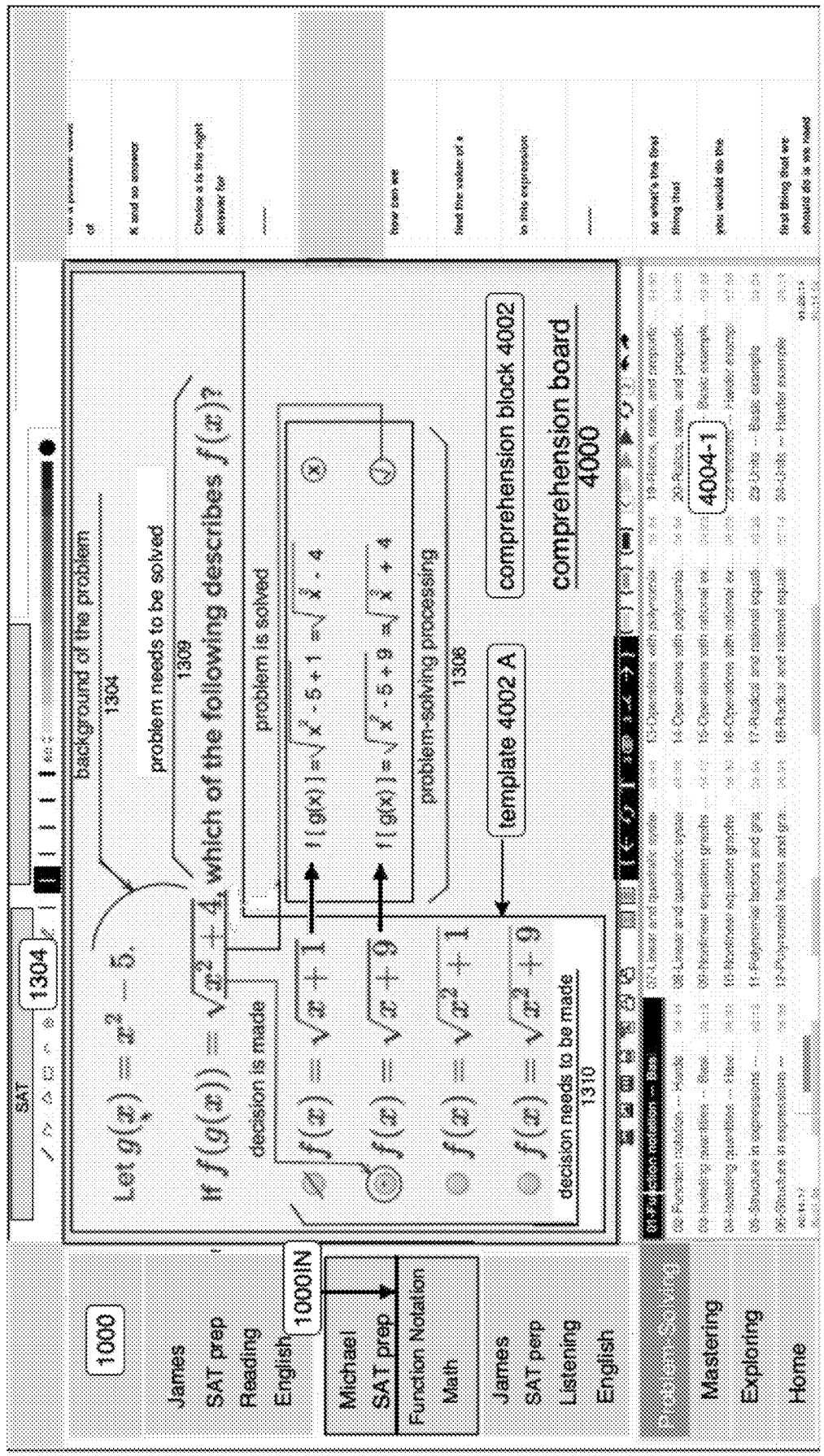
FIG. 13 is a view illustrating using templates for mastering problem-solving, according to various exemplary embodiments.

In another example of FIG. 13, a user types "SAT" in a search box 1304, and a list of videos related to the topic are displayed in the core scaffolding platform 1000. Users can scroll the core scaffolding platform 1000 and move the expected video to the redline indicator (e.g., 1000IN) and press "enter" to select the video to study.

As shown in FIGS. 11A and 13, various comprehension guides 4004 are generated. For example, the third comprehension guide 4004-3 may relate to one or more labels of the contents stored in the cognitive assistance system 100 and include keywords related to various content. The keywords may include author, subject, topic, title, vocabulary word, and/or formula. The third comprehension guide 4004-3 relates to various keywords describing or defining various content identified by the content ID 102 see, e.g., the core scaffolding platform 1000 in FIG. 11 displays various content and/or videos such as Math 2, Calculus, Math 3, etc. This is provided by way of an example and not by way of a limitation.

According to yet another exemplary embodiment, the search boxes (e.g., 4004-3 in FIG. 11A and 1304 in FIG. 13) may relate to labels of the videos, whereas a second search box (e.g., 4004-2 in FIG. 11) may relate to labels of key episodes 4008. As a variation, the third and second search boxes may be expanded to illustrate a list of labels of the videos or the key episodes 4008. Based on a user selection of a keyword, the content or episode is displayed from the location of the selected keyword. Another search box (not shown) may relate to a keyword or a label within a particular content (the video episodes 2004) and not just the key episodes 4008.

Figure 5:
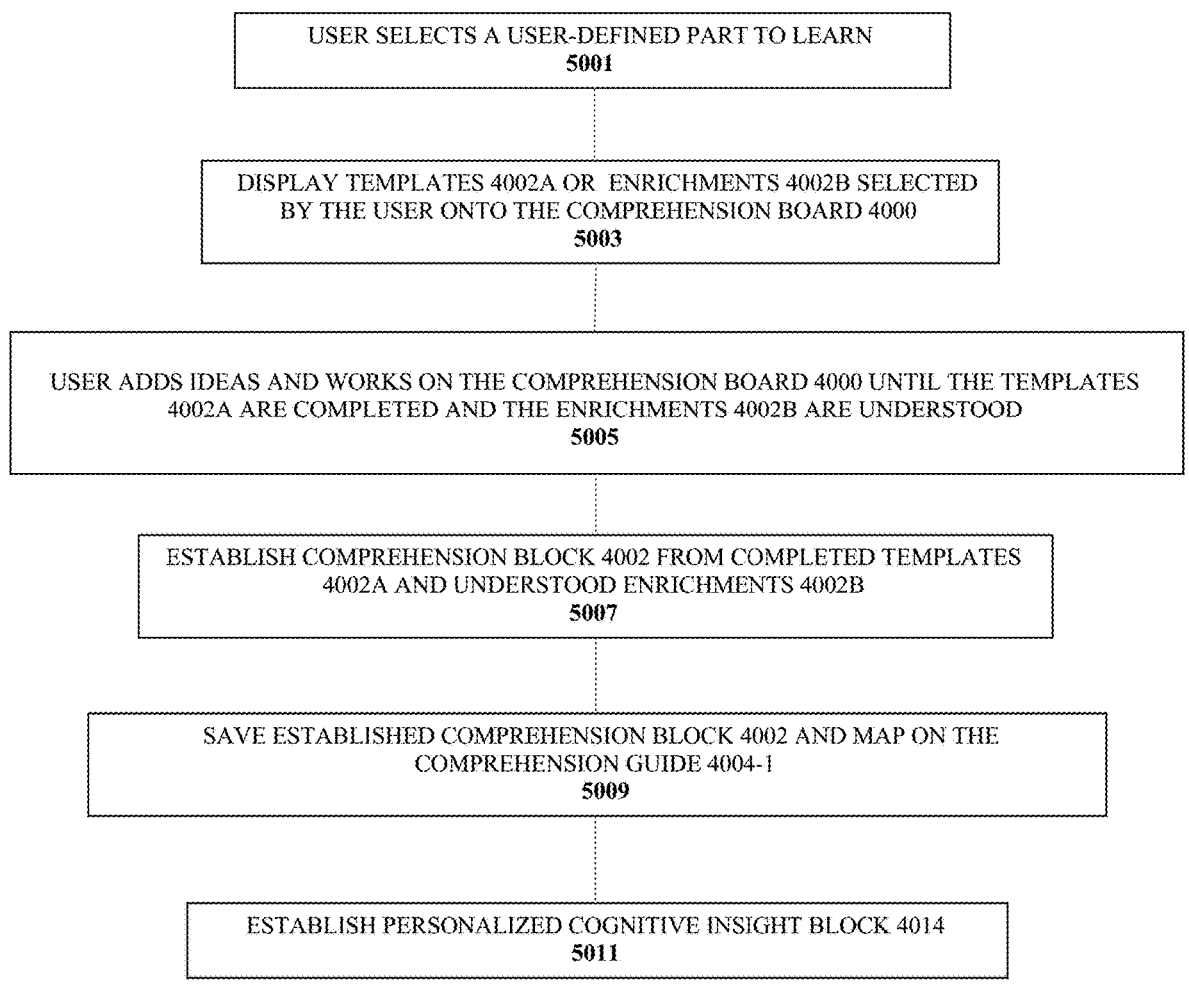
FIG. 5 is a flowchart illustrating a method of personalizing and mastering learning using templates, enrichment documents and a comprehension board, according to an exemplary embodiment.

In operation 4011, after the key episodes 4008 are created and mapped onto comprehension guides 4004, the author may attach templates 4002A onto each chapter or the user-defined part using the comprehension guide tool 4005t-n and attach one or more enrichments 4002B to each chapter using the comprehension guide tools such as the tool 4005t-4, as explained in further detail in FIG. 5.

In operation 4013, the cognitive insight block 4010 is formed. That is, after labels, key episodes 4008, templates 4002A, and enrichments 4002B are formed and attached, a cognitive insight block 4010 is formed, as explained in further detail below with reference to FIGS. 5-7.

Still referring to FIGS. 1A-4 but now together with FIGS. 5, 12, and 13, a method of generating a comprehension block 4002 is described, according to an exemplary embodiment. FIGS. 1A, 12, and 13 illustrate the comprehension board 4000 with a comprehension block 4002 thereon, according to various exemplary embodiments.

In operation 5001, a user selects a user-defined part from among the comprehension guides 4004 in order to personalize and master their understanding of the part. For example, the user selects a first label for a user-defined part (a first label of a particular chapter) using the first comprehension guides 4004-1 generated in operation 4009 of FIG. 4. In FIG. 12, the label "The Seven Year War" of chapter 7 is selected in the comprehension guide 4004-1 and in FIG. 13, the label "Function Notation—Basic" of chapter 1 is selected in the comprehension guide 4004-1.

In operation 5003, the user selects a template 4002A and/or an enrichment document (the enrichment 4002B), which are attached in the comprehension guides 4004-5 and 4004-4. The cognitive assistance system 100 displays the selected template 4002A or enrichment 4002B onto the comprehension board 4000.

The template 4002A may be a framework or a background for a problem, e.g., a homework that the viewer needs to complete based on the content in the chapter. As examples, it may be texts, tables, calculation sheets, question sheets, and so on, requiring the learners to fill in, cross, or select.

In FIG. 13, the template 4002A is provided and includes "background of the problem" 1304, "problem needs to be solved" 1309," and "decision needs to be made" 1310. Additionally, the "problem-solving processing" 1306 is added by the user to complete the template 4002A, in operation 5007 described below.

The enrichment 4002B is a document that provides the viewer additional information for the content in the chapter. The author may attach different perspectives of other authors about the content in the chapter. This is provided by way of an example and not by way of a limitation. In FIG. 12, three enrichment documents 4002B-1, 4002B-2, and 4002B-3 and two templates 4002A-1 and 4002A-2 for the chapter "The Seven Years War" are provided on the comprehension board 4000. The enrichment document 4002B-1 may be a document for reading comprehension. The enrichment document 4002B-1 may help the viewer in English reading, providing vocabulary terms for the history of America, and, more particularly, for "The Seven Years War" chapter. The viewers may use the enrichment document 4002B-1 to learn English and vocabulary terms in the context effectively and thus deepen understanding of the content and improve listening comprehension skills. The templates 4002A-1 and 4002A-2 may provide questions and possible responses in a multiple choice and/or an essay format.

The content creator may prepare a template 4002A-1 or the enrichment document 4002B-1 on the comprehension board 4000. The content creator may input a part of the enrichment document 4002B-1 from one or more external sources and continue to complete it on the comprehension board 4000. Alternatively or in addition thereto, the content creator may retrieve it from personal cognitive database and attach it to this chapter for the viewers. Also, the content creator uses the content from other reference sources e.g., download via a network such as internet.

In operation 5005, the user learns and works on the comprehension board 4000 until the templates 4002A are completed and the enrichments 4002B are understood.

In FIG. 12, the enrichments 4002B on the comprehension board 4000 may be already completed (studied) and the users may just be reviewing them. For example, during studying of a reading comprehension document (e.g., the enrichment document 1 4002B-1), the user may be memorizing the new vocabulary terms. Accordingly, the user may choose cognitive block tool 4005t-1 (FIG. 11B) and the comprehension board 4000 plays and reiterates chapter 7, "The Seven Years War." Whenever the user pauses the video, the comprehension board 4000 returns to display the reading comprehension document (e.g., the enrichment document 1 4002B-1).

In FIG. 13, the content is a template 4002A for solving a math problem. The user adds sketch, notes, explanations to link the ideas on comprehension board 4000 to answer or solve the problem (problem solving processing 1306).

In the same way as learning in FIG. 12, during working on the homework in the template 4002A, the user may play the video by choosing the cognitive block tool 4005t-1. The comprehension board 4000 turns to play and reiterate chapter 1 with the label "Function Notation—Basic" of the video lecture to show more explanations from the teacher teaching about how to solve a function notation problem. Whenever the user pauses the video, the comprehension board 4000 returns to display the template 4002A (the problem to be solved).

In addition to viewing the teacher's instruction in the video 2002, the user may also choose the cognitive block tool 4004t-3 to open the enrichments 4002B. In the enrichments 4002B, the teacher may prepare additional instructions, formulas, tips, and so on, that relate to how to solve the identified problem effectively (the enrichments 4002B is not shown in FIG. 13).

The user continues working on the problem until an answer is found e.g., the problem is solved. When the problem is solved, the user may choose the tool 4004t-3 to view the answer from the teacher in another enrichment 4002B.

In operation 5007, the comprehension block 4002 is established from completed templates 4002A and understood enrichments 4002B. In FIG. 13, the problem is solved. As such, it becomes the comprehension block 4002.

In operation 5009, the cognitive assistance system 100 saves the comprehension block 4002 in the user database with one of the cognitive IDs 101 corresponding to one of the cognitive IDs 101 of the corresponding one of the cognitive blocks 4006. The formed comprehension block 4002 mapped on the comprehension guide 4004-1. The user can review the comprehension block 4002 in the future using the cognitive block guide tools 4005t-3 and 4005t-n.

In operation 5011, the cognitive assistance system 100 establishes the personalized cognitive insight block 4014 in which the templates 4002A are completed and the enrichments 4002B are understood. In other words, the personalized cognitive insight block 4014 is formed for the personal database based on personal comprehension of the user by solving the templates 4002A and studying the enrichments 4002B. That is, a cognitive insight block 4010 includes the comprehension block 4002 with completed templates 4002A and understood enrichments 4002B, notes 4002C, etc. (see e.g., FIG. 1D). In other words, a personalized cognitive insight block 4014 includes user's individual understanding and comprehension e.g., completed templates 4002A, studied enrichments 4002B, and so on.

Figure 6:
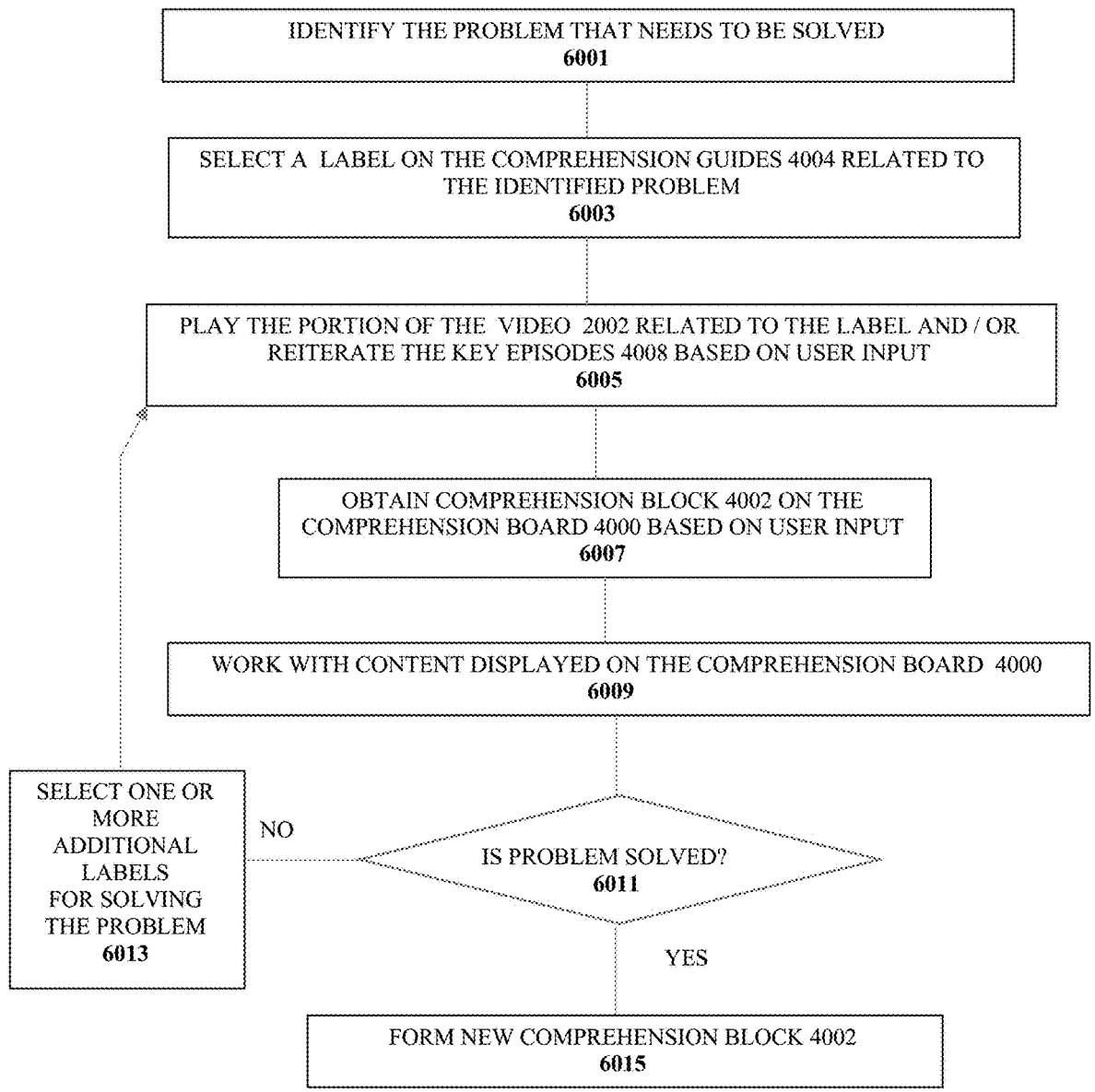
FIG. 6 is a flowchart illustrating a method of solving a problem using comprehension blocks, a comprehension board and comprehension guides, according to an exemplary embodiment.
Figure 14:
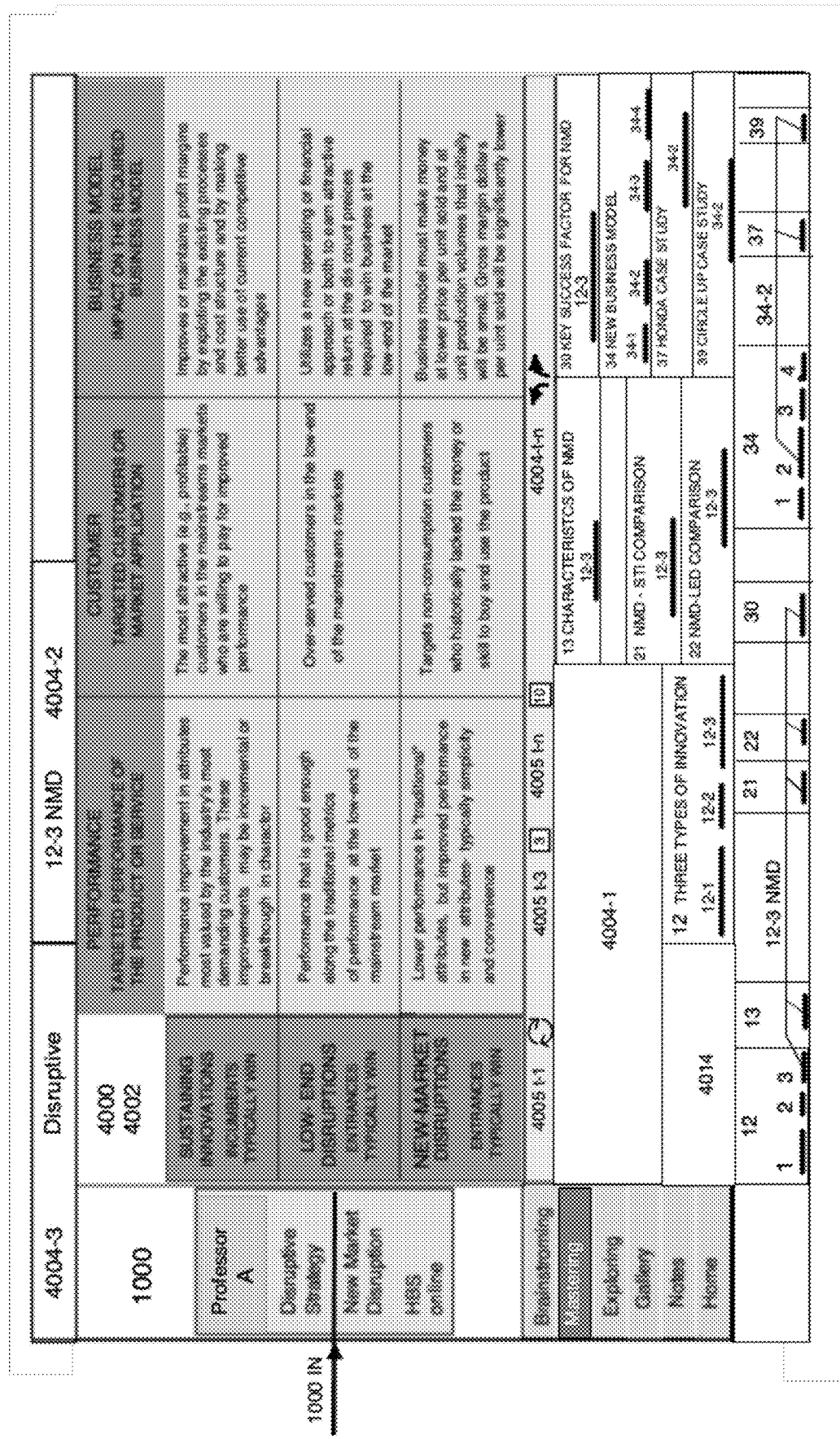
FIG. 14 is a view illustrating using cognitive insights or enriched learning videos for comprehension-building and problem-solving, according to another exemplary embodiment.

Still referring to FIGS. 1A-5 but now together with FIGS. 6, 8A, and 14, a method of using one or more of the comprehension block 4002 is described, according to an exemplary embodiment. FIGS. 8A and 14 are views illustrating the comprehension guides 4004 and the comprehension board 4000 with a comprehension block 4002 displayed thereon, according to various exemplary embodiments. FIG. 6 is a flowchart illustrating a method of using content and one or more of the comprehension block 4002.

In operation 6001, the cognitive assistance system 100 identifies one or more problem that need to be solved based on user input. The problems may be math problems, science problems, technical problems, multiple choice questions in various subjects and/or essay type questions in various subjects such as history, English, and so on. The problems are not limited to these examples and are applicable in other domains. The problems may relate to business strategies, business plans, financial problems, healthcare related issues, or other complex problems that may be encountered by a user.

In operation 6003, based on user input, a label is selected on a comprehension guide 4004-1 that is related to the problem to be solved. In one exemplary embodiment, the cognitive assistance system 100 may suggest a label based on the identified problem. For example, the user may input a first keyword related to the problem in a comprehension guide 4004-3 (FIGS. 11A and 13) and obtain related labels on the comprehension guide 4004-1.

In FIG. 14, the user wants to build a business strategy for a disruptive innovation, the user types "disruptive" into the comprehension guide 4004-3 (video search box). After the cognitive assistance system 100 receives the input "disruptive" through the comprehension guide 4004-3, the cognitive assistance system 100 controls a display to display a plurality of videos related to "disruptive" on the core scaffolding platform 1000. In the core scaffolding platform 1000, there may be several videos that the user has learned online from a Business School A, presented by the Professor A. The user scrolls to the video 2002 with the title "Disruptive Strategy" e.g., using the redline 1000IN, to select and view the video 2002. In FIG. 14, there are forty comprehension blocks such as the comprehension block 4002. They may include personalized cognitive insight blocks 4014 (already completed templates 4002A and studied enrichments 4002B, see e.g., FIG. 1C) and/or the cognitive insight block 4010 (that have various templates 4002A, enrichments 4002B, notes 4002C, and so on, see e.g., FIG. 1C), displayed in the comprehension guide 4004-1.

In FIG. 14, the user verifies if the disruptions relate to a "new-market disruption," according to the categories that were presented by Professor A. Therefore, the user may select one or more of related cognitive blocks 4006 or one or more of the formed cognitive insight blocks 4014, e.g., Chapter 12, with the label "Three Types of Innovations." Based on the selection, the cognitive block guide tool 4005t-3 indicates that the selected block "Three Types of Innovations" includes 3 personalized enrichments 4002B and the cognitive block tool 4005t-n indicates that the selected block has ten completed templates 4002A. For example, the completed templates 4002A may be displayed in a different form depending on whether they are completed, completed partially, not yet completed, not completed correctly (80% correct, 70% correct), and so on. As an example, number "3" and number "10" are displayed with a color-code orange indicating that the enrichments 4002B and templates 4002A, respectively, have been completed and/or fully understood.

In operation 6005, a portion of the video 2002 related to the content of chapter 12 "Three innovation" is played or display on the comprehension board 4000. The portion of the video 2002 may include video episodes 2004 and/or key episodes 4008 related to the label based on user input. That is the user may manipulate the key episode tool 4004t-1 to only play the key episodes 4008 with color-code highlights. The key episodes 4008 may help the user link key concepts in the chapter 12. Each key episode 4008 may be labeled with a keyword. Different key episodes 4008 at different chapters may have the same label.

For example, in chapter 12, Professor A introduces three types of innovation through three key episodes 12-1, 12-2, an 12-3 from among the key episodes 4008. These three key episodes 12-1, 12-2, an 12-3 are about sustaining innovation, low-end disruption, and new-market disruption. The three key episodes 12-1, 12-2, an 12-3 may be labeled with easy keywords such as "12-1 STI" for key episode related to "Sustaining Innovation", "12-2 LED" for key episode related to "Low-end disruption", "12-3 NMD" for key episode related to "New-market disruption". The key episode "12-3 NMD" in chapter 12 links with the key episodes 4008 in chapters 13, 21, 22, and 30 with the same label "12-3 NMD". For example, in chapter 13, a key episode "12-3 NMD" in which the Professor A focuses on three characteristics of new-market disruption and in chapter 22, a key episode "12-3 NMD" describes that an innovation can be both low-end disruption and new-market disruption. However, it cannot be both sustaining innovation and new-market disruption. In chapter 21, a key episode "12-3 NMD" describes that incumbents in the industry will go after new technology that help them make more profit. In chapter 30, a key episode "12-3 NMD" describes that an innovator must figure out a new business model for every new-market disruption to secure success in competition with incumbents in the industry. These key episodes in various chapters share the same label "12-3 NMD".

In operation 6007, the user can pause the video 2002. Based on pausing the video 2002 on a video episode 2004a, for example, a comprehension block 4002 attached to the respective video episode 2004a and respective cognitive block 1 4006A (chapter) is displayed on the comprehension board 4000 to provide additional information. For example, while viewing one of the key episodes 4008 having the label "12-3 NMD" e.g., in chapter 22 about "innovation can be both low-end disruption and new-market disruption," the user can pause the video 2002 and open enrichment 4002B to learn case studies "Circle-up" 34-2 in chapter 39 and "Honda" 34-2 in chapter 37. In other words, portions of the video 2002 may server as enrichment 4002B for another portion of the video 2002.

In operation 6009, the user works with the content on the comprehension board 4000. For example, the user can open templates 4002A that include tables which compare between sustaining innovation, low-end disruption, and new-market disruption, as shown in FIG. 14. Then the user can open templates 4002A that include tables that list characteristics of each type of innovation. The user may fill in the characteristic of his/her innovation into the template 4002A then compare, gather information to identify the type of his/her innovation. In an exemplary embodiment, after the user works with the information on the comprehension board 4000, his/her analysis confirms that the proposed innovation is a new-market disruption. In various example embodiments, working with content may include forming a comprehension block 4002, editing templates 4002A, studying enrichments 4002B, and so on.

In operation 6011, the user checks if the problem has been solved by reviewing the completion of the set target. If the user has identified "to build a business strategy for disruptive innovation" is the problem that needs to be solved. In operation 6009, the user has identified the innovation is a new-market disruption, and in operation 6011, the user knows the problem is solved if he/she figures out a business model, which must be different from the business model of the incumbent in the industry.

Based on the review, the problem has not been solved (No in operation 6011). The user continues working with the problem by selecting one or more labels in operation 6013 and returning to the operation 6005 with the newly selected one or more labels. That is, in operation 6013, the user identifies additional information for solving the problem and in operation 6005, the user may select chapter 34 with the label "new business model" in the comprehension guide 4004-1. The user then uses the cognitive block tool 4005*t*-1 to review the content of chapter 34 "New business model" in the form of a lecture video. The user may use the key episodes tool 4004*t*-1 to play the key episodes 4008 with a particular color-code or label. The key episodes 4008 help the user map the links of key ideas in the complex content.

In FIG. 14, there are four key episodes 34-1, 34-2, 34-3, and 34-4 in chapter 34. The first key episode 34-1 has a label "34-1 new customers," the second episode 34-2 has a label "34-2 redefine performance," a third episode 34-3 has a label "34-3 different profit formula," and a fourth episode 34-4 has a label "34-4 different distribution channels." In chapter 34, the first key episode 34-1 "34-1 new customers" describes that a new business model for an NMD should focus on a larger population of customers who previously did not have the ability to use or own the type of product which is a sustaining innovation of the incumbent. The third key episode 34-3 "34-3 different profit formula" describes that a new business model should not measure profitability by margin percentage per unit sold but rather how much money the company can obtain at a lower price and a much larger number of customers. The second key episode 34-2 "34-2 redefine performance" describes that the new business model should redefine the performance for new customers instead of following the one defined by the original customers of the incumbent. The key episodes 4008 with the same label may be found in different chapters, e.g., the second key episode 34-2 with label "34-2 redefine performance" in chapter 34 may be further found in the context of chapters 37 and 39.

In operations 6007 and 6009, the user goes back to chapter 34 "new business model," and opens templates 4002A to review and/or complete items therein and opens enrichments 4002B to study content therein.

In operation 6015, if the problem is solved (yes in operation 6011), a new comprehension block 4002 such as the answer for the problem is formed and stored in the user's personal database. That is, the personalized cognitive insight block 4014 is enriched by including the new comprehension block 4002 in which a problem is solved based on semantic content and/or content of the video type B.

Figure 7:
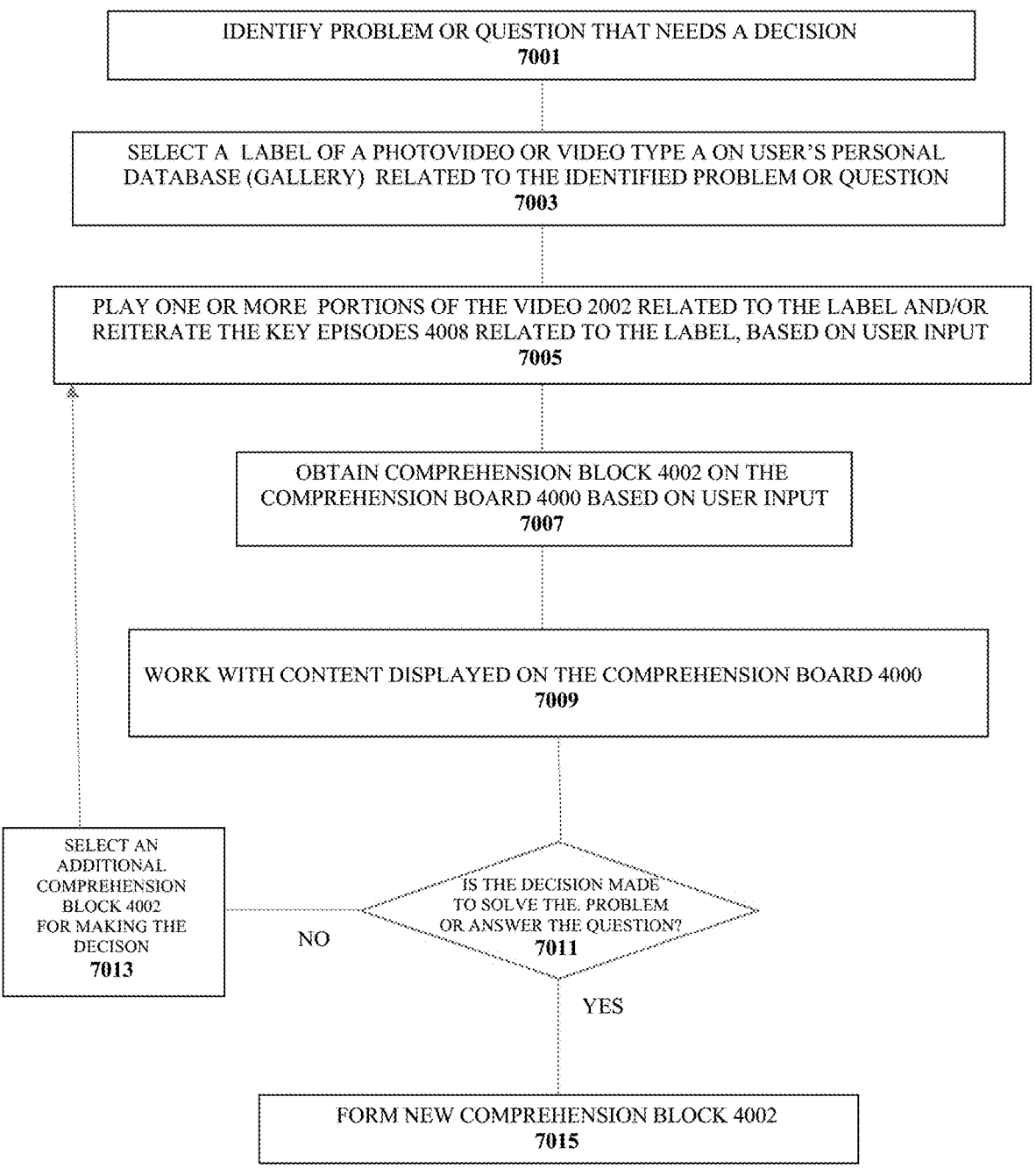
FIG. 7 is a flowchart illustrating a method of making a decision based on enriched experience videos, using cognitive insights, comprehension blocks, comprehension board and comprehension guides, according to an exemplary embodiment.
Figure 15:
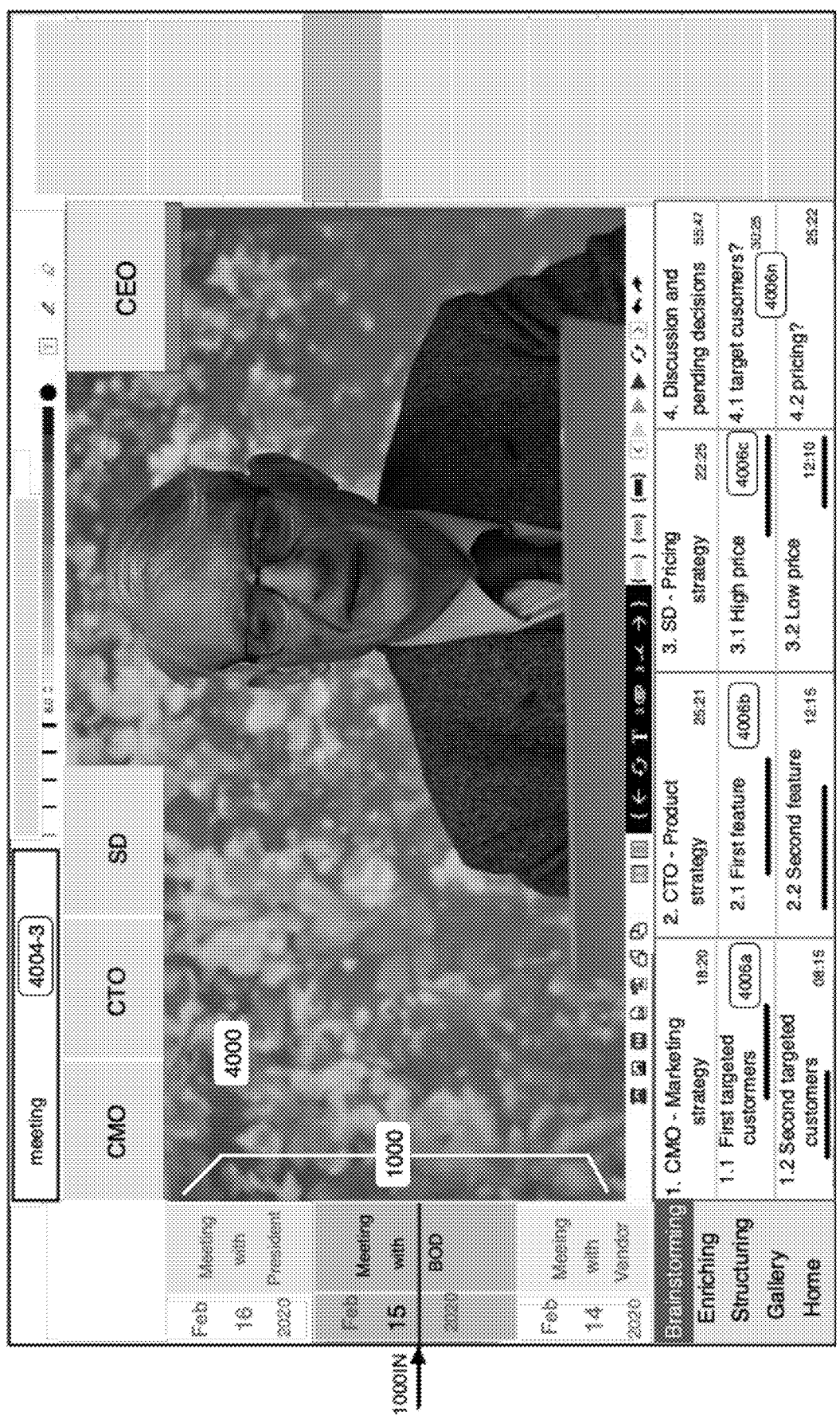
FIG. 15 is a view illustrating using enriched experience videos for decision-making, according to another exemplary embodiment.

Still referring to FIGS. 1A-6, but now together with FIGS. 7, 8B, and 15, a method of using the combination of learning and experience is described, according to an exemplary embodiment. FIGS. 8B and 15 are views illustrating a comprehension board 4000 with a comprehension block 4002 thereon, according to various exemplary embodiments.

FIG. 7 is a flowchart illustrating a method of using one or more photovideo and a video 2002A of a video type A in combination with learning videos or a video 2002B of a video type B to make a decision.

In operation 7001, the user identifies a problem that needs to be solved or a question that needs to be answered. In other words, the user determines that a decision needs to be made. For example, the user may need to make a decision for choosing a college to apply to, selling price for a product, or determine and select features or functionalities of an offered service, or target consumer database (select customers) to sell a product to. These are but some examples and not provided by way of a limitation. Other domains are within the scope of the inventive concept and may include investment related decisions, business development decisions, and/or other decisions encountered in a user's live.

In operation 7003, the user selects a label of a photovideo or the video 2002A from the user's personal database (gallery). The label relates to the identified problem or question. In one variation, based on the identified problem, the cognitive assistance system 100 may suggest one or more labels to the user.

Figure 8:
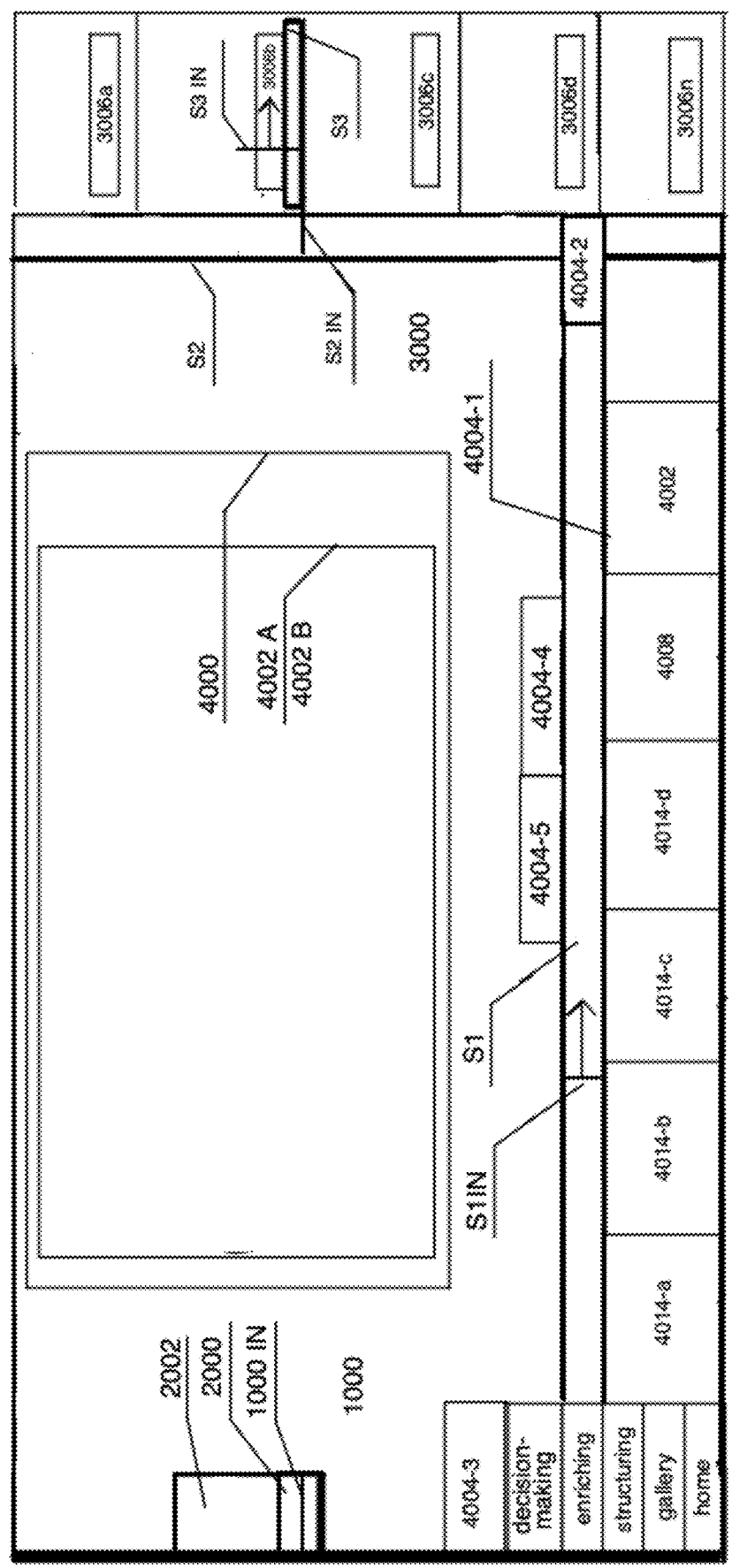
FIG. 8B are block diagrams illustrating an enriched experience video for making decisions, according to an exemplary embodiment.

In FIGS. 8B and 15, the user wants to make a decision in a Board of Directors (BOD) meeting. The user types "meeting" into the comprehension guide 4004-3 (e.g., a video search box related to keywords type label, that may be provided in different locations on a user interface as shown in FIGS. 8 and 15). The cognitive assistance system 100 obtains user input of "meeting" using the comprehension guide 4004-3, retrieves one or more videos of the video type A, and controls a display to display the retrieved videos of the video type A related to the keyword "meeting" on the core scaffolding platform 1000. In the core scaffolding platform 1000, there may be several meeting videos that the user has conducted. Other meetings were with potential customers, vendors, and so on. The user scrolls, on the core scaffolding platform 1000 to select the video 2002A relevant to the identified problem or question e.g., the video 2002A with the title "Meeting with BOD" by positioning the indicator on the redline 1000 IN.

In FIG. 8B, there are four cognitive insight blocks 4010-*a*, 4010-*b*, 4010-*c*, 4010-4*d* for the "Meeting with BOD" video 2002A that are displayed on the comprehension guide 4004-1.

In FIG. 15, there are a plurality of user-defined parts or cognitive blocks 4006*a*-*n*. The title or label of the first cognitive block 4006*a* or chapter is "Marketing strategy with CMO," the label of the second cognitive block 4006*b* is "Product features with CTO," the label of the third cognitive block 4006*c* is "Pricing strategy with Sales Director," and the label of the fourth cognitive block 4006*n* is "Discussion and pending decisions." The user may want to review discussions and pending decisions and select the fourth cognitive block 4006*n* with the label "Discussion and pending decisions." The cognitive block tools 4005*t*-3 and 4005*t*-*n* illustrate that the selected fourth cognitive block 4006*n* "discussion and pending decisions" has no enrichments 4002B and completed templates 4002A. The selected fourth cognitive block 4006*n* has two key episodes 4008 labeled "target customers?" and "pricing?."

In operation 7005, the user selects, using the cognitive block tool 4005*t*-1, to review contents of chapter 4 with a label "discussion and pending decision". The cognitive block tool 4004*t*-1 enables the user to play and replay the chapter 4 until another command is provided. The user may also select, via the key episode tool 4004*t*-1 to play the key episodes 4008 with a predetermined color-code. The key episodes 4008 (with the same label) help the user link a key idea in different chapters.

For example, in FIG. 8B, key episodes 4008 may be reviewed on the comprehension board 4000. In FIG. 15, the key episodes 4008 relating to "pricing" in chapter 4 may be linked with the key episode 4008 relating to "pricing" in chapters 3. Similarly, the key episodes 4008 relating to "target customer" in chapter 4 may be linked with the key episodes 4008 related to "target customers" in chapter 1.

In operation 7007, the cognitive assistance system 100 obtains a comprehension block 4002 on the comprehension board 4000 based on user input. That is, the user can pause the video 2002A and open a comprehension block 4002 attached to each of the cognitive blocks 4006*a*-*n*. For example, while viewing the key video episodes 4008 in the cognitive block 4006*a*, with a label "target customer," the user can pause the video 2002A and open the market needs and feasibility study document (the enrichments 2002B) to learn more about the incumbent's performance and profit formula. The user may also open and study various researches such as "population of customers group A," and "defining product performance from customers group A." and so on (enrichments 2002B).

In operation 7009, the user works with the content on the comprehension board 4000.

With reference to FIG. 15, the user can attach the most relevant templates 4002A and enrichments 4002B from the cognitive blocks 4006*a* and 4006*c* to the cognitive block 4006*n*. The user then opens various enrichments from other cognitive blocks 4006 (such as chapters 12, 13, 21, 22, 30, 34, 37 and 39 of the video 2002B of the video type B in FIG. 14 which provide theories and different case studies on three types of innovations, method of defining customer performance, and the models of profit formulas). The user can generate new templates 4002A, which gather related information, fill in existing templates 4002A, and so on.

The user may then decide not to pursue the first feature at the first launch and instead pursue the second feature—obtain new customers (consumer base). The user may also decide on a pricing strategy and profit formula, e.g., a low pricing strategy for customers who have less money and profitability not being based on the percentage of margin per unit sold but rather on how much money the company can make based on a larger population of customers. According, in operation 7011, the cognitive assistance system 100 checks if the decision(s) have been made. If so (yes in operation 7011), in operation 7015, a new comprehension block 4002 as a new business strategy is formed and a personalized cognitive insight block 4014 is enriched. That is, the personalized cognitive insight block 4014 is enriched by a new comprehension block 4002 in which a decision is made based on experience content (episodic content of a video type A) with the support of learning content of a video type B, such as to decide which price to sell or which business model to perform, etc. (see e.g., FIG. 15).

If a decision has not been made (no in operation 7011), the cognitive assistance system 100 may provide an additional related comprehension block 4002 to help the user make the decision.

Figure 9:
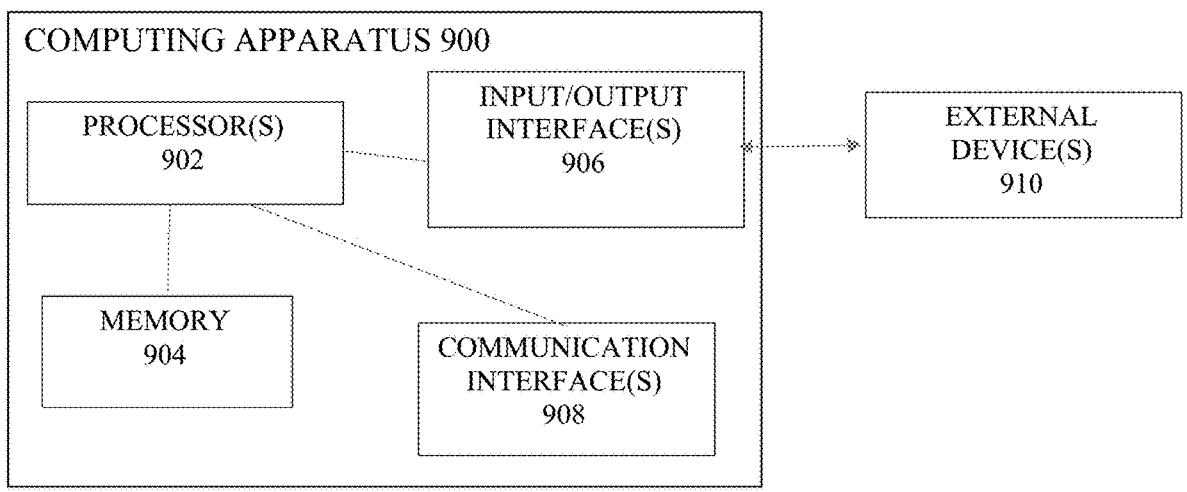
FIG. 9 is a block diagram illustrating hardware components of the cognitive assistance system, according to an exemplary embodiment.

FIG. 9 is a block diagram illustrating hardware components of a cognitive assistance system 100, according to an exemplary embodiment.

In FIG. 9, a cognitive apparatus (a computing apparatus 900) may be a server and/or include one or more computers. The apparatus 900 is a processing apparatus that includes one or more processors 902, which may be a central processing unit (CPU), which controls the apparatus and its hardware components and executes software instructions stored in one or more memories such as a memory 904. By way of an example, the one or more processors 902 may also include a random access memory (RAM), a read only memory (ROM), one or more graphical processes, interfaces, and so on. Components of the one or more processors 902 may be connected to each other via a bus.

The processor 902 is further connected to input/output interfaces 906 that may connect the processor to one or more external device(s) 910 such as a display, which outputs recorded and/or original video signals in various forms and formats and displays the comprehension guides 4004, the comprehension board 4000, and various comprehension integrated contents, timelines, platforms described with reference to FIGS. 8A-B, and 11-15. The external device(s) includes a speaker, which outputs an audio sound. This is provided by way of an example and not by way of a limitation. Multiple speakers may be provided and maybe external to the display.

The one or more processors 902 may be connected to one or more communication interfaces 908 (a network interface or a network card) which may include a WiFi chip, a Bluetooth chip, wireless network chip, and so on. The one or more communication interfaces 908 may further include one or more ports for wired connections. Additionally, the computing apparatus 900 may include the memory 904, which may store one or more of executable instructions which when executed by the one or more processors 902 cause the processor to control the computing apparatus 900 and its components. The memory 904 may further store audio and video data (contents) and computer executable instructions to be executed by the processor to perform one or more of the operations set forth in FIGS. 2-7, 16, and 17. The computing apparatus 900 may further include a user interface as one of the input/output interfaces 906, which may include buttons, keyboard, a mouse, a USB port, a microphone, a gesture sensor, and so on. The user interface receives user input in various formats such as gestures, audio via a microphone, keyboard, mouse, touch screen, and so on, provided by way of an example and not by way of a limitation.

The processors 902 may execute instructions stored in the memory 904. The instructions cause the processor 902 to obtain, via the user interface (the input/output interfaces 906), a first user input, to divide multimedia data into a plurality of cognitive blocks based on the first user input, obtain, via the user interface, a second user input, generate a comprehension block that corresponds to a respective cognitive block from among the plurality of cognitive blocks. The comprehension block includes enrichment data related to the respective cognitive block. The instructions further cause the processor 902 to link the comprehension block with the respective cognitive block to thereby form at least one cognitive insight with respect to the multimedia data and to provide the comprehension block based on a consecutive output of the plurality of cognitive blocks being paused at the respective cognitive block.

The instructions may further cause the processor 902 to obtain multimedia data and divide the multimedia data into a plurality of consecutive episodic blocks. The instructions may further cause the processor 902 to stamp the plurality of consecutive episodic blocks with a corresponding video identifier (ID) from among a plurality of video IDs and to divide, based on user input received via the input/output interfaces 906, the multimedia data into a plurality of user-defined parts. The instructions may further cause the processor 902 assign a label to each of the plurality of user-defined parts based on the user input and stamp each of the plurality of user-defined parts with a corresponding cognitive ID from among a plurality of cognitive IDs. The instructions may further cause the processor 902 to control the display to display, based on the plurality of video IDs and the plurality of cognitive IDs, a comprehension guide comprising the label for each of the plurality of the user-defined parts while playing the plurality of episodic blocks.

Figure 10:
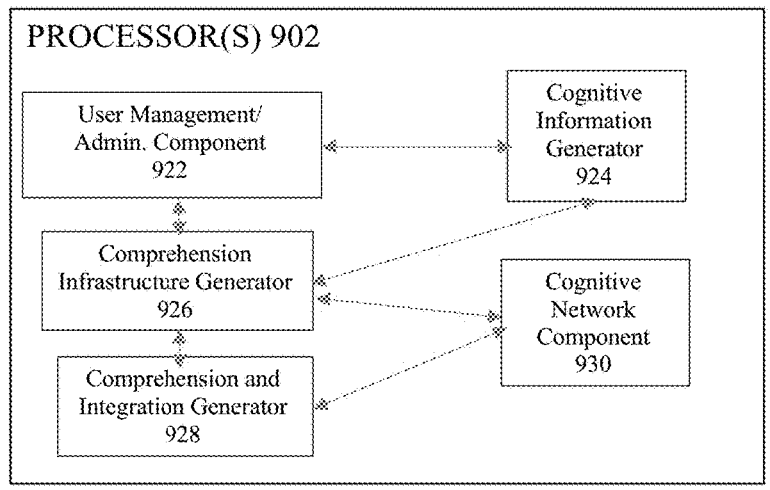
FIG. 10 is a block diagram illustrating various components of a cognitive assistance system, according to an exemplary embodiment.

FIG. 10 is a block diagram illustrating various components of the cognitive assistance system 100, according to an exemplary embodiment. For example, the one or more processors 902 may execute the cognitive assistance system 100 that includes various components such as a user management and administrative component 922, a cognitive information generator 924, a comprehension infrastructure generator 926, a comprehension and integration generator 928, and a cognitive network component 930.

The user management and administrative component 922 is responsible for generating individual databases for each user. The database includes various content (videos) obtained by a user, and various corresponding comprehension blocks (generated by the user) and/or obtained with the video. The cognitive information generator 924 obtains content and sets the content into a cognitive structure (comprehension-integrated content). That is, the cognitive information generator 924 performs the operations described above with reference to FIGS. 2, 3, 16, and 17. For example, the cognitive information generator 924 divides the content into CRUs, sets identifiers, and generates the video platform and the video scaffolding platform 3000.

The comprehension infrastructure generator 926 generates the comprehension board 4000 and corresponding tools to work with the obtained content. The comprehension infrastructure generator 926 further generates the comprehension guides 4004. That is, it performs one or more of the operations described above with reference to FIGS. 4-7, 16, and 17 and tools described with reference to FIGS. 8A, 8B, and 11-15.

The comprehension and integration generator 928 generates links for the content such as links between the comprehension blocks 4002, the corresponding cognitive blocks 4006, semantic blocks 3006, and/or episodic blocks (the video episodes 2004). The comprehension and integration generator 928 performs one or more of the operations described above with reference to FIGS. 4-7, 16, and 17 by forming bracing link using various cognitive IDs 101, the comprehension ID 401, and the content IDs 102. The comprehension and integration generator 928 generates and provides for a display one or more of the timelines on various platforms described above with reference to FIGS. 7, 8A, 8B, and 11-15.

The cognitive network component 930 facilitates communication among various users e.g., by forming a network in which comments are shared among viewers and/or the presenter. The cognitive network component 930 is configured to provide one or more of the tools for saving comprehension blocks 4002, sharing them with the presenter and/or another user, posting contents, as described with reference to FIGS. 7, 8A, 8B, and 11-15.

Figure 16:
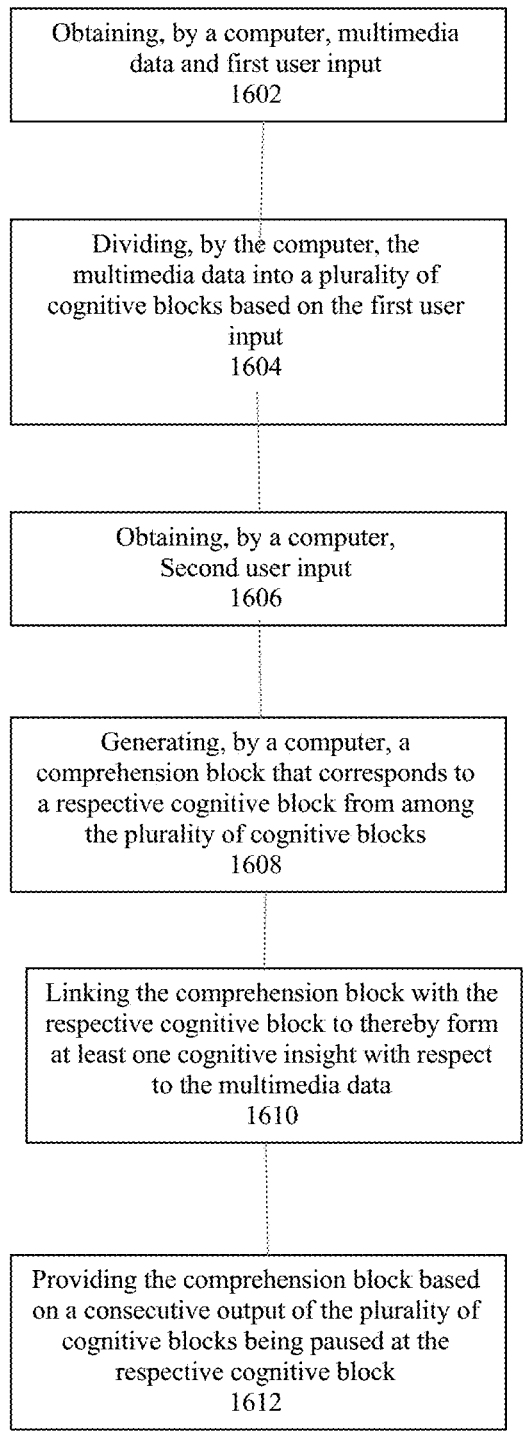
FIG. 16 is a flowchart illustrating a method of providing cognitive assistance by forming one or more comprehension blocks, according to an exemplary embodiment.

Next, a method 1600 of providing cognitive assistance by forming comprehension blocks 4002, according to an exemplary embodiment, is described with reference to FIG. 16.

The method 1600 includes obtaining, by a computer, multimedia data and first user input, in operation 1602 and dividing, by the computer, the multimedia data into a plurality of cognitive blocks based on the first user input, in operation 1604.

The method 1600 further includes obtaining, by the computer, second user input, in operation 1606 and generating, by the computer, a comprehension block that corresponds to a respective cognitive block from among the plurality of cognitive blocks, in operation 1608. The comprehension block includes enrichment data related to the respective cognitive block.

The method 1600 further includes linking the comprehension block with the respective cognitive block to thereby form at least one cognitive insight with respect to the multimedia data, in operation 1610 and providing the comprehension block based on a consecutive output of the plurality of cognitive blocks being paused at the respective cognitive block, at operation 1612.

Next, a method 1700 of providing cognitive assistance by generating one or more comprehension guides 4004, according to an exemplary embodiment, is described with reference to FIG. 17.

The method 1700 includes obtaining, by a computer, multimedia data, in operation 1702 and dividing, by the computer, the multimedia data into a plurality of consecutive episodic blocks, in operation 1704.

The method further includes stamping, by the computer, the plurality of consecutive episodic blocks with a corresponding video identifier (ID) from among a plurality of video IDs, in operation 1706 and dividing, by the computer, based on user input, the multimedia data into a plurality of user-defined parts, in operation 1708.

The method further includes assigning, by the computer, a label to each of the plurality of user-defined parts based on the user input, in operation 1710 and stamping, by the computer, each of the plurality of user-defined parts with a corresponding cognitive ID from among a plurality of cognitive IDs, in operation 1712. The method further includes displaying, by the computer, based on the plurality of video IDs and the plurality of cognitive IDs, in operation 1714. A comprehension guide comprising the label for each of the plurality of the user-defined parts while playing the plurality of episodic blocks.

Many changes may be apparent to those of ordinary skill in the art without departing from the scope and spirit of the described embodiments. The terminology used herein was chosen to best explain the principles of the embodiments, the practical application or technical improvement over technologies found in the market place or to enable ordinary skill in the art to understand the embodiments disclosed herein.

In an exemplary embodiment, the term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or device.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C++, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infrared transmitter to convert the data to an infrared signal. An infrared detector can receive the data carried in the infrared signal and appropriate circuitry can place the data on the data bus. The bus carries the data to the volatile storage, from which processor retrieves and executes the instructions. The instructions received by the volatile memory may optionally be stored on persistent storage device either before or after execution by a processor. The instructions may also be downloaded into the computer platform via Internet using a variety of network data communication protocols well known in the art.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Exemplary embodiments were chosen and described in order to explain operations and the practical applications thereof, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present disclosure is not intended to be limited to exemplary embodiments described herein but is to be accorded the widest scope as defined by the features of the claims and equivalents thereof

What is claimed is:

1. A method of providing a cognitive assistance, the method comprising:
   obtaining, by a computer, multimedia data;
   first dividing the multimedia data into a plurality of cognitive resolution units (CRUs), the CRUs are equal in length and of 1 to 5 seconds and correspond to a specious present; obtaining first user input;
   second dividing, by the computer, the multimedia data into a plurality of cognitive blocks based on the first user input, wherein the plurality of cognitive blocks are user-defined blocks and form primary content and wherein the second dividing of the multimedia data includes grouping at least two consecutive CRUs of the plurality of CRUs into a respective cognitive block based on user input selecting a start point and a stop point;
   obtaining, by the computer, second user input including a respective label for each of the plurality of cognitive blocks;
   generating, by the computer, a comprehension block that corresponds to a respective cognitive block from among the plurality of cognitive blocks, wherein the comprehension block includes enrichment data related to the respective cognitive block;
   linking the comprehension block with the respective cognitive block to thereby form at least one cognitive insight specific to an individual comprehension of a user with respect to the multimedia data; and
   providing the comprehension block based on a consecutive output of the plurality of cognitive blocks being paused at the respective cognitive block.

2. The method of claim 1, further comprising:
   stamping a unique video identifier (ID) on each of the plurality of CRUs; and
   stamping a cognitive ID on the respective cognitive block.

3. The method of claim 2, further comprising:
   semantically analyzing, by the computer, the plurality of CRUs to extract a semantic meaning of each of the plurality of CRUs;
   converting, by the computer, the semantic meaning into a text, a sketch, a symbol, or an image to represent a cue for a respective CRU; and
   generating, by the computer, a plurality of semantic blocks that respectively correspond to the plurality of CRUs and further comprise the cue.

4. The method of claim 2, further comprising:
   obtaining, by the computer, third user input comprising a selection of a portion of the multimedia data and a corresponding cue;
   generating, by the computer, a comprehension guide including the corresponding cue; and
   displaying, by the computer, the comprehension guide on a comprehension platform together with the plurality of cognitive blocks.

5. The method of claim 1, wherein at least one cognitive block and the comprehension block form a cognitive insight which is a contextual comprehension block for facilitating solving a problem or making a decision.

6. The method of claim 1, further comprising:
   synchronously displaying, by the computer, the plurality of cognitive blocks on a comprehension board;
   obtaining a third user input to pause at the respective cognitive block;
   performing, by the computer, a lookup operation for the comprehension block linked to the respective cognitive block;
   pausing at the respective cognitive block based on the third user input; and
   in response to pausing at the respective cognitive block, displaying the comprehension block on the comprehension board based on the lookup operation so as to facilitate solving a problem or making a decision based on the plurality of cognitive blocks surrounding the respective cognitive block and the comprehension block.

7. The method of claim 6, wherein the comprehension board is a user interface configured to receive additional user input for solving the problem or making the decision in the comprehension block.

8. The method of claim 1, further comprising:
   obtaining third user input comprising at least one keyword;
   performing, by the computer, a lookup for the keyword in the plurality of cognitive blocks; and
   displaying, by the computer, on a comprehension board the respective cognitive block and/or the comprehension block that is linked to the keyword.

9. The method of claim 1, further comprising:
   generating and outputting a comprehension guide comprising a plurality of labels for the plurality of cognitive blocks,
   wherein:
     the plurality of cognitive blocks have different durations and/or form a hierarchical structure comprising the user-defined blocks and a plurality of user-defined sub-parts, and
     dividing the multimedia data into the plurality of cognitive blocks is occurring during playback of the multimedia data.

10. The method of claim 1, further comprising:
    generating, by the computer, a first set of metadata for the multimedia data and a second set of metadata for the multimedia data; and
    generating and outputting, by the computer, a first search field for searching the first set of metadata and a second search field for searching the second set of metadata,
    wherein the first set of metadata and the second set of metadata are keywords input by different users and/or relate to a different hierarchical level of the multimedia data.

11. The method of claim 1, further comprising:
    generating and outputting, by the computer, a first comprehension guide, on a comprehension board, comprising a plurality of labels for the plurality of cognitive blocks, the plurality of cognitive blocks have different durations and/or form a hierarchical structure comprising a plurality of user-defined parts and a plurality of user-defined sub-parts;
    obtaining, by the computer, a third user input including a cue;
    performing, by the computer, a lookup operation for one or more cognitive blocks from among the plurality of cognitive blocks that include the cue to form a set of cognitive blocks that include the cue; and generating and outputting a second comprehension guide, on the comprehension board, comprising a set of labels corresponding to the set of cognitive blocks.

12. An apparatus of providing cognitive assistance, comprising:
a memory configured to store computer executable instructions; and
a processor configured to execute the stored computer executable instructions, which when executed by the processor causes the processor to:
perform a first dividing operation in which multimedia data is divided into a plurality of cognitive resolution units (CRUs), the CRUs are equal in length and of 1 to 5 seconds and correspond to a specious present;
obtain, via a user interface, a first user input;
perform a second dividing operation in which the multimedia data is divided into a plurality of cognitive blocks based on the first user input, wherein the plurality of cognitive blocks are user-defined blocks and form primary content and wherein the second dividing operation includes grouping at least two consecutive CRUs of the plurality of CRUs into a respective cognitive block based on user input selecting a start point and a stop point;
obtain, via the user interface, a second user input including a respective label for each of the plurality of cognitive blocks;
generate a comprehension block that corresponds to a respective cognitive block from among the plurality of cognitive blocks, wherein the comprehension block includes enrichment data related to the respective cognitive block;
link the comprehension block with the respective cognitive block to thereby form at least one cognitive insight specific to an individual comprehension of a user with respect to the multimedia data; and
provide the comprehension block based on a consecutive output of the plurality of cognitive blocks being paused at the respective cognitive block.

13. The apparatus of claim 12, wherein the stored computer executable instructions further cause the processor to:
stamp a unique video identifier (ID) on each of the plurality of CRUs; and
stamp a cognitive ID on the respective cognitive block.

14. The apparatus of claim 13, wherein the stored computer executable instructions further cause the processor to:
semantically analyze the plurality of CRUs to extract a semantic meaning of each of the plurality of CRUs;
convert the semantic meaning into a text, a sketch, a symbol, or an image to represent a cue for a respective CRU; and
generate a plurality of semantic blocks that respectively correspond to the plurality of CRUs and further comprise the cue.

15. The apparatus of claim 13, wherein the stored computer executable instructions further cause the processor to:
obtain third user input comprising a selection of a portion of the multimedia data and a corresponding cue;
generate a comprehension guide including the corresponding cue; and
display the comprehension guide on a comprehension platform together with the plurality of cognitive blocks.

16. A non-transitory computer readable medium encoded with instructions that, when executed by a processor, cause the processor to perform operations including:
obtaining multimedia data;
performing a first dividing operation in which the multimedia data is divided into a plurality of cognitive resolution units (CRUs), the CRUs are equal in length and of 1 to 5 seconds and correspond to a specious present;
obtaining first user input;
performing a second dividing operation in which the multimedia data is divided into a plurality of cognitive blocks based on the first user input, wherein the plurality of cognitive blocks are user-defined blocks and form primary content and wherein the second dividing operation includes grouping at least two consecutive CRUs of the plurality of CRUs into a respective cognitive block based on user input selecting a start point and a stop point;
obtaining second user input including a respective label for each of the plurality of cognitive blocks;
generating a comprehension block that corresponds to a respective cognitive block from among the plurality of cognitive blocks, wherein the comprehension block includes enrichment data related to the respective cognitive block;
linking the comprehension block with the respective cognitive block to thereby form at least one cognitive insight specific to an individual comprehension of a user with respect to the multimedia data; and
providing the comprehension block based on a consecutive output of the plurality of cognitive blocks being paused at the respective cognitive block.

17. The non-transitory computer readable medium of claim 16, wherein the instructions cause the processor to divide the multimedia data into the plurality of cognitive blocks by:
stamping a unique video identifier (ID) on each of the plurality of CRUs; and
stamping a cognitive ID on the respective cognitive block.

18. The non-transitory computer readable medium of claim 17, wherein the instructions cause the processor to perform additional operations comprising:
semantically analyzing the plurality of CRUs to extract a semantic meaning of each of the plurality of CRUs;
converting the semantic meaning into a text, a sketch, a symbol, or an image to represent a cue for a respective CRU; and
generating a plurality of semantic blocks that respectively correspond to the plurality of CRUs and further comprise the cue.

19. The non-transitory computer readable medium of claim 17, wherein the instructions cause the processor to perform an additional operation comprising:
obtaining third user input comprising a selection of a portion of the multimedia data and a corresponding cue;
generating a comprehension guide including the corresponding cue; and
displaying the comprehension guide on a comprehension platform together with the plurality of cognitive blocks.

20. The non-transitory computer readable medium of claim 16, wherein at least one cognitive block and the comprehension block form a cognitive insight which is a contextual comprehension block for facilitating solving a problem or making a decision.

21. The non-transitory computer readable medium of claim 16, wherein the instructions cause the processor to perform additional operations comprising:
synchronously displaying the plurality of cognitive blocks on a comprehension board;

obtaining a third user input to pause at the respective cognitive block;

performing a lookup operation for the comprehension block linked to the respective cognitive block;

pausing at the respective cognitive block based on the third user input; and in response to pausing at the respective cognitive block, displaying the comprehension block on the comprehension board based on the lookup operation so as to facilitate solving a problem or making a decision based on the plurality of cognitive blocks surrounding the respective cognitive block and the comprehension block.

22. The non-transitory computer readable medium of claim 21, wherein the comprehension board is a user interface configured to receive additional user input for solving the problem or making the decision in the comprehension block.

\* \* \* \* \*